US012801628B1

(12) United States Patent
Bhola et al.

(10) Patent No.: US 12,801,628 B1
(45) Date of Patent: Nov. 17, 2026

(54) SYSTEMS AND METHODS FOR QUORUM REPLICATION FLOW CONTROL FOR MULTI CONSENSUS-BASED REPLICATION

(71) Applicant: Cockroach Labs, Inc., New York, NY (US)

(72) Inventors: Sumeer Kumar Bhola, Brooklyn, NY (US); Austen William McClernon, New York, NY (US); Pavel Kalinnikov, London (GB)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 19/214,800

(22) Filed: May 21, 2025

(51) Int. Cl.
*G06F 16/27* (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS 10,944,812 B1 * 3/2021 Veppumthara ...... H04L 67/1001
11,089,105 B1 * 8/2021 Karumbunathan ... G06F 16/275
11,853,317 B1 * 12/2023 Goyal ................. G06F 16/2477
12,002,039 B2 * 6/2024 Padmanabhan ..... G06F 21/6218
12,007,977 B1 * 6/2024 Singh ....................... G06F 16/27
12,368,713 B2 * 7/2025 Jaiswal ............... H04L 63/0807
2016/0117318 A1 * 4/2016 Helland ................ G06F 16/214 707/634
2016/0259834 A1 * 9/2016 Bishop ................ G06F 11/3006
2017/0344618 A1 * 11/2017 Horowitz ............ G06F 11/0709
2019/0361916 A1 * 11/2019 Weaver ................... G06F 16/00
2021/0141770 A1 * 5/2021 Wang .................. G06F 11/1451
2023/0117856 A1 * 4/2023 Vattem .................... G06F 16/27 707/705
2025/0181423 A1 * 6/2025 Bhola ..................... G06F 16/27

* cited by examiner

*Primary Examiner* — Eliyah S. Harper
(74) *Attorney, Agent, or Firm* — Goodwin Procter LLP

(57) ABSTRACT

Systems and methods for controlling resource utilization for a consensus-based distributed group of replicas are provided. A leader node can receive a write request including instructions to write to three or more replicas of a range The leader node stores a leader replica, follower nodes each store a follower replica, and the leader node is configured to coordinate a consensus protocol for executing the instructions. The write request is evaluated based on determining sizes of evaluation token pools associated with the leader node and follower nodes by determining a size of the write request and generating a log entry. The write request is executed based on determining the respective sizes of send token pools associated with the follower nodes. Evaluation and send token pools control pacing of replication of the log entry stores of the leader and follower nodes.

23 Claims, 7 Drawing Sheets

100

SYSTEMS AND METHODS FOR QUORUM REPLICATION FLOW CONTROL FOR MULTI CONSENSUS-BASED REPLICATION

FIELD OF TECHNOLOGY

The present disclosure relates generally to methods and systems for controlling resource utilization at a distributed system and more particularly, to controlling resource utilization for a consensus-based distributed group of replicas stored by the distributed system.

BACKGROUND

In some cases, relational databases can apply replication to ensure data survivability, where data is replicated among one or more computing devices ("nodes") of a group of computing devices ("cluster") configured to function as a single distributed database server. A relational database may store the data within one or more ranges, such that a range can include one or more key-value (KV) pairs and can be replicated among one or more nodes of the cluster. A range may be a partition of a data table ("table"), where a table may include one or more ranges. The database may receive and process requests (e.g., such as read or write requests originating from client devices) directed to data and/or schema objects stored by the database, thereby allowing for reading from and modification of the data and/or schema objects.

In some cases, for failure tolerance and data survivability, a range can be replicated across two or more nodes included in the cluster to maintain data availability in the event of a node failure. As described further herein, a consensus protocol (e.g., Raft, Paxos, etc.) can be used to apply updates to the range and the data included in the range, such that at least a threshold number (e.g., a majority number) of replicas can be required to agree to commit an update to a range to modify a state of the replica (e.g., modify values corresponding to particular keys). Using consensus-based state machine replication, each of the replicas of a particular range maintains a respective log of updates to the state of a replica, with the consensus protocol ensuring that the log includes the same updates and in the same order across each of the replicas of the range. When an update in the log is considered "committed" by the consensus protocol, each replica can apply the update included in the log to its respective local copy of the replica state. The application of the update by the replicas can be deterministic, thereby ensuring that all replicas of the range that apply the same sequence of updates will have the same resulting state.

Consensus-based state machine replication (e.g., using a log at each replica) is a common fault tolerance mechanism used in distributed computing systems. In some cases, such distributed computing systems can include distributed database systems (e.g., NoSQL database systems, SQL database systems, etc.) including a number of nodes storing a very large database (e.g., including a number of terabytes or petabytes). Such a database cannot feasibly be stored by replicas solely in K nodes, with K being the replication factor of the replicas, such as 3. When K=3, the distributed computing system can tolerate a failure of one node storing a replica, and when K=5, the distributed computing system can tolerate a failure (e.g., unavailability) of two nodes each storing a replica, as such replication factors allow at least a majority number of the replicas agree to commit updates to the replicas via a distributed consensus protocol. These distributed database systems can partition the database state using techniques such as hash partitioning and range partitioning. Each range formed by the partitioning can operate according to a respective consensus protocol, and the replicas of the range that participate in the consensus protocol can form a group referred to herein as a "consensus group". The state size of a range can be selectable and can vary, for example, from 512 megabytes (MB) to tens of gigabytes (GB).

In some cases, an individual node included in such a distributed database system can store replicas corresponding to a number of different ranges. For example, for a range size of 10 GB and a node having a 1 terabyte (TB) non-volatile storage medium (e.g., solid state drive storage, disk storage, etc.), the node could store up to 100 ranges. Accordingly, the ranges stored by an individual node share the physical computing resources of the node, such as a central processing unit (CPU), non-volatile storage (e.g., solid state drive storage, disk storage, etc.), and volatile storage (e.g., memory such as random access memory (RAM)) of the node.

In some cases, for a distributed database system, a workload stored by the distributed database system can include one or more ranges and can be associated with (e.g., operated by) a particular tenant (e.g., entity, customer, organization, etc.). Further, a tenant can be associated with and operate one or more workloads stored by nodes of the distributed database system. In some cases, multiple workloads each including one or more ranges may share the same computing resources (e.g., nodes), such that replicas of ranges corresponding to different workloads can be stored on the same node. In multi-tenant systems, the workloads stored by the nodes can be associated with multiple tenants, such that multiple tenants access and interact with their respective workloads that can be stored by one or more of the same nodes. Accordingly, providing performance isolation between workloads sharing the computing resources of the distributed database system can be desirable, particularly when workloads can correspond to different tenants (e.g., as in multi-tenant systems). In some cases, strict prioritization techniques and/or fair-sharing techniques (e.g., based on weights assigned to workloads and/or tenants associated with workloads) can be used to provide performance isolation in a distributed database system. For example, conventional distributed database systems can apply performance isolation techniques at a replica (e.g., leader replica) at which a request (e.g., a read request and/or write request) originates. However, conventional systems fail to apply performance isolation techniques at replicas (e.g., follower replicas) to which a request is replicated despite these replicas utilizing a higher share of computing resources of nodes than the replica at which the request originates. As an example, a distributed database system may include a number of ranges, with (i) each range having K=5 replicas, and (ii) the leader replica of each range being uniformly distributed across all of the nodes (e.g., five nodes) of the system. For such a system, 80% (4/5) of the ranges stored by a particular node of the nodes are follower replicas of the ranges and 20% (1/5) of the ranges stored by a particular node of the nodes are leader replicas of the ranges, such that follower replicas provide a majority of resource utilization at each node. By failing to apply performance isolation techniques at replicas to which requests are replicated, conventional systems fail to account for the resource utilization of up to 80% of the replicas of ranges, resulting in poor performance isolation when resource utilization is high and the partitions are operated by different tenants. For these reasons, conventional systems (i) provide poor performance isolation between workloads and/or (ii) can require over-provisioned computing resources to avoid high utilization of the resources at nodes. Accordingly, improved systems and methods for controlling resource utilization are desired that can adequately provide performance isolation between workloads for consensus-based replication techniques.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Methods and systems for controlling resource utilization for a consensus-based distributed group of replicas are disclosed. In one aspect, embodiments of the present disclosure feature a method for controlling resource utilization for a consensus-based distributed group of replicas. According to one embodiment, the method includes receiving, by a leader node of a plurality of nodes, a first write request (i) corresponding to a first tenant and (ii) including first instructions to write to three or more replicas of a first range, where the leader node stores a leader replica of the replicas, where at least two follower nodes of the nodes each store a follower replica of the replicas, and where the leader node is configured to coordinate a consensus protocol for executing the first instructions of the first write request. The method also includes determining, in response to receiving the first write request, respective sizes of a plurality of evaluation token pools associated with the leader node, the at least two follower nodes, and the first tenant, where the leader node and the at least two follower nodes each correspond to a respective evaluation token pool of the plurality of evaluation token pools, and where each evaluation token pool includes a plurality of evaluation tokens. The method also includes evaluating, in response to determining the respective sizes of a majority of the plurality of evaluation token pools are greater than a first threshold size, the first write request by (i) determining a size of the first write request and (ii) generating a first log entry for the first write request. The method also includes determining, in response to evaluating the first write request, respective sizes of a plurality of send token pools associated with the at least two follower nodes and the first tenant, where the at least two follower nodes each correspond to a respective send token pool of the plurality of send token pools, where each send token pool includes a plurality of send tokens. The method also includes executing, based on determining the respective sizes of the plurality of send token pools, the first write request, the executing including sending the first log entry to a first follower node of the at least two follower nodes based on the respective size of the send token pool corresponding to the first follower node, where the first follower node is configured to write to the follower replica stored by the first follower node using the first log entry, and writing to the leader replica based on the first log entry.

Various embodiments of the method can include one or more of the following features. The method may also include where the first write request originates from a client device associated with the first tenant. The method may also include where the leader node stores the plurality of evaluation token pools and the plurality of send token pools. The method may also include where the plurality of evaluation token pools and the plurality of send token pools correspond to a first workload for the first tenant, the first workload including one or more ranges stored by the plurality of nodes, where the one or more ranges include the first range. The method may also include where the leader node uses the plurality of evaluation token pools to determine when to evaluate the first write request. The method may also include comparing the respective sizes of the plurality of evaluation token pools to the first threshold size. The method may also include queuing the first request in an evaluation queue corresponding to the first range and operated by the leader node in response to determining the respective sizes of less than the majority of the plurality of evaluation token pools are greater the first threshold size. The method may also include where the first write request is an elastic write request, and where evaluating the first write request further includes evaluating, in response to determining the respective sizes of each of the plurality of evaluation token pools are greater than the first threshold size, the first write request by (i) determining the size of the first write request and (ii) generating the first log entry for the first write request. The method may also include deducting, in response to evaluating the first write request, the size of the first write request from the evaluation tokens of each of the plurality of evaluation token pools. The method may also include where the leader node uses the plurality of send token pools to determine when to send the first log entry to the at least two follower nodes.

The method may also include comparing the respective sizes of the plurality of send token pools to a second threshold size. The method may also include where the leader node operates a plurality of send queues including (i) a leader send queue associated with the leader node, (ii) a first send queue associated with the first follower node of the at least two follower nodes, and (iii) a second send queue associated with a second follower node of the at least two follower nodes. The method may also include where writing to the leader replica further includes in response to a majority of the leader node and the at least two follower nodes writing the first log entry to a respective write log stored by each of the leader node and the at least two follower nodes, writing to modify a state of the leader replica in a state machine of the leader node based on the first log entry. The method may also include where the leader node operates an admission queue, where the method further includes queuing first metadata for the first log entry in the admission queue, where the admission queue is configured to queue metadata for a plurality of log entries configured to write to one or more stores of the leader node, and where the metadata for the plurality of log entries includes the first metadata for the first log entry, dequeuing, based on a utilization of physical resources of the leader node, the metadata for the first log entry from the admission queue, and adding, in response to dequeuing the metadata for the first log entry from the admission queue, the size of the first write request to the evaluation tokens of the evaluation token pool corresponding to the leader node.

The method may also include where sending the first log entry to first follower node further includes sending the first log entry to the first follower node in response to determining (i) the respective size of the send token pool corresponding to the first follower node is greater than a second threshold size and (ii) the first send queue associated with the first follower node is empty. The method may also include queuing the first log entry in the first send queue in response to determining the respective size of the send token pool corresponding to the first follower node is less than or equal to a second threshold size. The method may also include deducting, in response to sending the first log entry to the first follower node, the size of the first write request from the send tokens of the send token pool corresponding to the first follower node. The method may also include where the first follower node is configured to operate an admission queue and to perform operations includes queuing first metadata for the first log entry in the admission queue, where the admission queue is configured to queue metadata for a plurality of log entries configured to write to one or more stores of the first follower node, and where the metadata for the plurality of log entries includes the first metadata for the first log entry, dequeuing, based on a utilization of physical resources of the first follower node, the first log entry from the admission queue, and causing addition, in response to dequeuing the first metadata for the first log entry from the admission queue, of the size of the first write request to (i) the evaluation tokens of the evaluation token pool corresponding to the first follower node and (ii) the send tokens of the send token pool corresponding to the first follower node. The method may also include where the leader node is configured to track the first metadata dequeued from the admission queue to control the addition of the size of the first write request to (i) the evaluation tokens of the evaluation token pool corresponding to the first follower node and (ii) the send tokens of the send token pool corresponding to the first follower node.

The method may also include determining less than a majority of the plurality of send queues are empty, the majority of the plurality of send queues including the leader send queue, where the first send queue includes one or more first log entries, and where the second send queue includes one or more second log entries, and flushing, in response determining less than the majority of the plurality of send queues are empty, at least one of the first send queue or the second send queue. The method may also include where flushing at least one of the first send queue or the second send queue further includes flushing at least the first send queue by sending the one or more first log entries to the first follower node, and further includes deducting, in response to sending the one or more first log entries to the first follower node, the size of the one or more first log entries from the send tokens of the send token pool corresponding to the first follower node. The method may also include where the first send queue is flushed based on a first number of the send tokens of the send token pool corresponding to the first follower node being greater than a second number of the send tokens of the send token pool corresponding to the second follower node.

In another aspect, the present disclosure features a system for controlling resource utilization for a consensus-based distributed group of replicas. The system can include corresponding computer systems (e.g., servers), apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
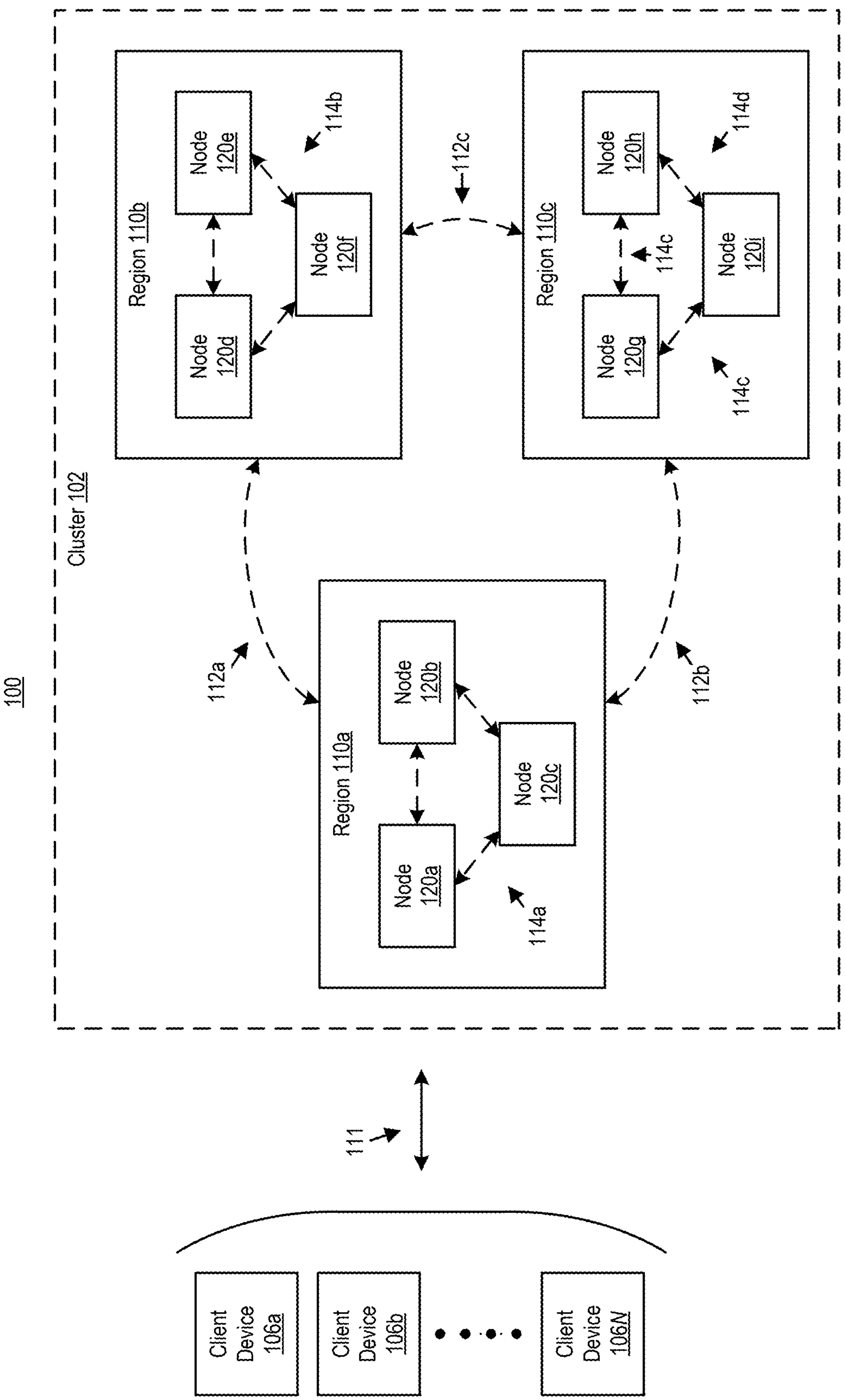
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for controlling computing resource utilization for a consensus-based distributed group of replicas of a range are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

MOTIVATION FOR SOME EMBODIMENTS

As described herein, conventional distributed computing systems fail to provide performance isolation techniques between workloads for follower replicas to which requests are replicated by a leader replica. By failing to account for resource utilization by follower replicas, conventional systems promote poor performance isolation between workloads when resource utilization is high. Accordingly, in conventional systems, a first workload including a first follower replica stored by a node can negatively impact performance (e.g., latency) for a second workload corresponding to a leader replica or a second follower replica stored by the node via write requests directed to the first follower replica, as such write requests can disproportionately utilize physical computing resources (e.g., CPU, non-volatile storage, volatile memory, etc.) of the node. For example, write requests executing at a node storing a follower replica of a first range associated with a first workload or tenant can delay execution of second write requests waiting to execute at the same node for a replica (e.g., leader replica or follower replica) of a second, different range associated with a second, different workload or tenant. To overcome these deficiencies, conventional systems are required to over-provision computing resources to (i) avoid high utilization of the computing resources at nodes and (ii) mitigate performance impacts between workloads.

Further, solutions have been introduced that provide some performance isolation under normal functioning of leader and follower nodes, but these solutions fail to provide performance isolation when a leader or follower node is required to restart, when a leader or follower node becomes disconnected from other nodes, or when a network partition between different nodes heals. These solutions are also limited by pacing execution of new write operations at the rate tolerated by the slowest follower replica of a particular consensus group. Such behavior is unacceptable for end-users since a “gray” failure at one node (e.g., slow disk storage due to some hardware problem) operating a replica of a consensus group will slow down execution of write operations for the consensus group. Rather, end-users of consensus-based state machine replication expect the system to function without performance degradation when a quorum of replicas are healthy and available. Further, such solutions fail to pace replication of already evaluated write requests. As an example, a node that restarts or reestablishes a connection with other nodes by healing a network partition can be required to execute a number of write requests for a particular replica to bring the replica’s write log up to date with the replicas of its consensus, thereby overloading a store of that node. Such an overload can cause production incidents as the node attempts to execute write requests as fast as its computing resources allow, at the expense of any other write requests directed to the node. Accordingly, improved systems and methods for controlling resource utilization for consensus-based distributed groups of replicas are provided to eliminate effects of slow nodes storing replicas of consensus groups.

To provide admission control for execution of write requests by nodes storing consensus groups of replicas, evaluation token pools and send token pools are introduced for use among the nodes of the consensus groups, with the token pools providing performance isolation to execution of write requests by the nodes and pacing of execution of regular work at the rate of a majority of replicas of a consensus group. For each store of a node corresponding to a particular tenant (e.g., via storage of at least one replica corresponding to that tenant), fixed-size pools of evaluation tokens can be introduced for both regular and elastic work. Accordingly, for regular work and at a leaseholder node storing a leaseholder replica for a particular range, a write request directed to the range is required to acquire evaluation tokens for a majority of the stores storing the voting replicas of that range before proceeding to latching and evaluation of the write request. Further, for each non-local store of a node corresponding to a particular tenant, fixed-size pools of send tokens can be introduced for both regular and elastic work. After the write request is evaluated, the leader node storing the leader replica for the range paces replication of the write request and its corresponding log entry to the follower nodes storing follower replicas of the range by acquiring send tokens removed deducted from send token pools. As a follower node receives a log entry derived from a write request, the follower node can immediately write the log entry to its Raft log, while queuing metadata for the log entry in a virtual admission queue operating at the node. Further, the leader node can write the log entry to its Raft log, while queuing metadata for the log entry in a virtual admission queue operating at the node. Such virtual admission queues can pace replenishing of evaluation and send tokens to their respective pools, without delaying writing to Raft logs to achieve consensus.

Once the log entry is dequeued from the virtual admission queue, the evaluation tokens and send tokens consumed for that write request and log entry can be added back to the token pools for subsequent requests. When no send tokens are available to send the log entry to the follower node, the leader node can queue the log entry in a send queue for that follower node, thereby halting replication from the leader node to that follower node for the tenant corresponding to that log entry. Further, in the event that less than a majority of send queues are empty, the leader node can execute a force flushing operation to send all queued log entries of one or more of the send queues to the follower nodes to which they are directed, thereby preventing delay in replicas achieving consensus. Each of evaluation tokens, send tokens, and send queues can integrate with the consensus protocol executing among nodes storing replicas of ranges to prevent overutilization of physical computing resources, while maintaining inter-tenant and/or inter-workload fairness. While application of evaluation tokens, send tokens, and send queues are described herein with respect to a Raft consensus protocol, a person of ordinary skill in the art would appreciate that the techniques described herein may be applied to replicas of data that operate according to any type of distributed consensus protocol.

Terms

“Cluster” generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices that are located in both the eastern United States and western United States, with 2 data centers in the eastern United States and 4 data centers in the western United States.

"Node" or "computing node" generally refers to an individual computing device (e.g., server) that is a part of a cluster. A node can include and operate one or more stores (e.g., persistent storage devices, such as disks) for organizing and managing stored data. A node may join with one or more other nodes to form a cluster. One or more nodes that comprise a cluster may store data (e.g., tables, indexes, etc.) in a map of KV pairs, with each node operating a state machine encoded by state variables among its one or more stores. A node may store a "range" encoded by state variables as part of its state machine, with the range of the state machine being modifiable by one or more commands (e.g., read requests, write requests, schema change requests, etc.). A range can include a subset of the KV pairs (or all of the KV pairs depending on the size of the range) stored by the cluster, with a node storing one or more ranges. A range may also be referred to as a "shard," a "tablet," and/or a "partition." A table and its secondary indexes can be mapped to one or more ranges, such that each KV pair in a range may represent a single row in the table (which can also be referred to as the primary index based on the table being sorted by the primary key) or a single row in a secondary index. Based on a range reaching or exceeding a threshold storage size, the range may split into two ranges. For example, based on reaching 512 mebibytes (MiB) in size, the range may be split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a "primary index") for the primary key column(s). A primary key may be defined for each table stored by a database as described herein. An example of a second type of index may be a "secondary index." A secondary index may be defined on non-primary key columns of a table. A table that does not include a defined primary index may include a hidden row identifier (ID) (e.g., referred to as rowid) column that uniquely identifies each row of the table as an implicit primary index.

"Replica" generally refers to a copy of a range. A range may be replicated at least a threshold number of times to produce a number of replicas. For example, and by default, a range may be replicated three times as three distinct replicas. Each replica of a range may be stored on a distinct node of a cluster. For example, three replicas of a range may each be stored on a different node of a cluster, with no node of the cluster storing more than one replica of a particular range. In some cases, a range may be required to be replicated a minimum of three times to produce at least three replicas. A node can store one or more replicas corresponding to one or more different ranges among its one or more stores. In some cases, ranges may be replicated based on data survivability preferences as described further in U.S. patent application Ser. No. 17/978,752, filed on Nov. 1, 2022, and published as U.S. Patent Application Publication No. 2023/0145054 on May 11, 2023, and in U.S. patent application Ser. No. 18/365,888, filed on Aug. 4, 2023, and published as U.S. Patent Application Publication No. 2024/0045887 on Feb. 8, 2024, which are hereby incorporated by reference herein in their entireties.

"Leaseholder" or "leaseholder replica" generally refers to a replica of a range that is configured to hold the lease for the replicas of the range. The leaseholder may receive and/or coordinate read requests and write requests directed to one or more KV pairs stored by the range. "Leaseholder node" may generally refer to the node of the cluster that stores the leaseholder replica. The leaseholder may receive read requests of read transactions and may serve the read requests to transaction coordinators operating on gateway nodes that received the read transactions by providing read KVs to the transaction coordinators, such that the transaction coordinators can send the read KVs to client devices from which the read transactions originate. Other replicas of the range that are not the leaseholder may receive read requests and may send (e.g., route) the read requests to the leaseholder, such that the leaseholder can serve the read requests based on the read transaction. The leaseholder may receive write requests of write transactions and may route the write requests to the leader replica of the range for execution via distributed consensus. The leaseholder may be assigned as the leaseholder for a period of time among the replicas of the range, and can change replicas as described herein.

"Raft group" or "consensus group" generally refers to a group of the replicas for a particular range. The consensus group may only include voting replicas (e.g., leader and follower replicas) for the range and the consensus group may participate in a distributed consensus protocol and include operations as described herein.

"Raft leader" or "leader" generally refers to a replica of the range that is a leader for managing write transactions for a range. The leader receives write requests included in write transactions directed to the range from the leaseholder for the range (e.g., unless the leaseholder and leader are the same replica) coordinates execution of the write requests among the consensus group. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority (i.e., quorum) of the replicas of the range.

"Follower" or "follower replica" generally refers to a voting replica of the range that is not the leader. "Follower node" may generally refer to a node of the cluster that stores the follower replica. Follower replicas may receive write requests corresponding to transactions from the leader replica. The leader replica and the follower replicas of a range may constitute voting replicas that participate in a distributed consensus protocol and included operations (also referred to as "Raft protocol" and "Raft operations") as described herein.

"Raft log" and "write log" generally refers to a time-ordered log of log entries indicative of write requests (e.g., included in transactions) to a range, where the log of log entries indicate write requests and the included updates to a state of the range agreed to by at least a threshold number of the replicas of the range. Each replica of a range may include a Raft log stored on the node that stores the replica. A Raft log for a replica may be stored on persistent storage (e.g., non-volatile storage such as disk storage, solid state-drive (SSD) storage, etc.). A Raft log may be a source of truth for replication among nodes for a range. Each log entry included in the Raft log may be ordered based on a timestamp at which the log entry was added to the Raft log, such that the application order of the updates to each replica is the same for each replica of the range.

"Consistency" generally refers to causality and the ordering of transactions within a distributed system. Consistency defines rules for operations within the distributed system, such that data stored by the system will remain consistent with respect to read and write requests originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write request of a write transaction. Based on achieving consensus, data modified by write request of the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

"Regular work" generally refers to foreground write requests and/or schema change operations that are intended to complete execution in a timely manner. Regular work may be higher priority and prioritized for execution relative to elastic work as described herein. A non-limiting example of regular work can include a write request originating from a client device directed to modifying a particular value for a particular key (e.g., a shopping cart transaction).

"Elastic work" generally refers to background write requests and/or schema change operations that are intended to complete execution depending on resource availability without impacting the performance of execution of regular work. Accordingly, elastic work is permitted to complete execution in a variable amount of time to prioritize execution of regular work. Some non-limiting examples of elastic work can include a write request that performs bulk copying of range data and a structured query language (SQL) schema change operation to a range that involves generating a new secondary index.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations (e.g., requests) that may operate on the distributed KV store.

In some embodiments, as described herein, the KV store of the database may be comprised of one or more ranges. A range may have a selected maximum storage size. For example, a range may have a maximum size of 512 MiB. Each range may be replicated to more than one node to maintain data survivability. For example, each range may be replicated to at least three nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction including at least one read request from a client device. A node may receive a write transaction including at least one write request from a client device. In some cases, a node can receive a read transaction or a write transaction from another node of the cluster. For example, a leaseholder node may receive a read transaction from a gateway node that originally received the read transaction from a client device. In some cases, a node can send a read transaction to another node of the cluster. For example, a node that received a read transaction, but cannot serve the read transaction may send the read transaction to the leaseholder node. In some cases, when a node receives a read transaction or write transaction that it cannot directly serve, the node may send and/or otherwise route the transaction to the node that can serve the transaction.

In some embodiments, modifications to the data of a range may rely on a consensus protocol (e.g., a Raft protocol) to ensure a threshold number of replicas of the range agree to commit the change. The threshold number of replicas may be a majority number of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node (e.g., at the timestamp indicated by the clock when the transaction was received by the gateway node). The transaction may assign the timestamp to the KVs that are subject to (e.g., modified by) the transaction. Timestamps may enable tracking of versions of KVs (e.g., through multi-version concurrency control (MVCC) as to be described herein) and may provide guaranteed transactional isolation.

In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table," where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, a database architecture for the cluster of nodes may include one or more layers. The one or more layers may process received SQL RPCs into actionable processes to access, modify, store, and return data to client devices, while providing for data replication and consistency among nodes of a cluster. The layers may include one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus protocol (e.g., consensus algorithm). The storage layer may commit writes from the Raft log to disk storage (e.g., a non-volatile, persistent computer-readable storage medium on a node), as well as return requested data (e.g., read data) to the replication layer.

In some embodiments, the transaction layer may enable ACID semantics for transactions within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a particular key may have a different timestamp, such that no two versions of the same key can have the same timestamp.

Transaction Layer

In some embodiments, the database architecture for a database stored by a cluster (e.g., cluster 102) of nodes may include a transaction layer. The transaction layer may enable ACID semantics for transactions operating on data and schemas within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a key may have a different timestamp, such that no versions of the key can have the same timestamp.

In some embodiments, for write transactions, the transaction layer may generate one or more locks. A lock may represent a provisional, uncommitted state for a particular value of a KV pair. The lock may be written as part of a write request of the write transaction. The database architecture described herein may include multiple lock types. In some cases, the transactional layer may generate unreplicated locks, which may be stored in an in-memory lock table (e.g., stored by volatile, non-persistent storage of a node) that is specific to the node storing the replica on which the write transaction executes. An unreplicated lock may not be replicated other replicas based on a consensus protocol as described herein. In other cases, the transactional layer may generate one or more replicated locks (referred to as "intents" or "write intents"). An intent may be a persistent, provisional value written by a transaction before the transaction commits that is stored in persistent storage (e.g., non-volatile storage such as disk storage, SSD storage, etc.) of nodes of the cluster. Each KV write operation performed by a transaction can initially be an intent, which includes a provisional version and a reference to the transaction's corresponding transaction record. An intent may differ from a committed value by including a pointer to a transaction record of a transaction that wrote the intent. In some cases, the intent functions as an exclusive lock on the KV data of the replica stored on the node on which the write request of the write transaction executes, thereby preventing conflicting read and write requests having timestamps greater than or equal to a timestamp corresponding to the intent (e.g., the timestamp assigned to the transaction when the intent was written). An intent may be replicated to other nodes of the cluster storing a replica of the range based on the consensus protocol as described herein. An intent for a particular key may be included in an MVCC history corresponding to the key, such that a reader of the key can distinguish the intent from other versions of committed MVCC values stored in persistent storage for the key.

In some embodiments, each transaction directed to the cluster may have a unique replicated KV pair (referred to as a "transaction record") stored on a range stored by the cluster. The transaction for a record may be added and stored in a replica of a range on which a first write request of the write transaction occurs. The transaction record for a particular transaction may store metadata corresponding to the transaction. The metadata may include an indication of a status of a transaction and a unique identifier (ID) corresponding to the transaction. The status of a transaction may be one of: "pending" (also referred to as "PENDING"), staging (also referred to as "STAGING"), "committed" (also referred to as "COMMITTED"), or "aborted" (also referred to as "ABORTED") as described herein. A pending state may indicate that the transaction is in progress. A staging state may be used to enable a parallel commit protocol. A committed state may indicate that the transaction has committed and the write intents written by the transaction have been recorded by follower replicas. An aborted state may indicate the write transaction has been aborted and the values (e.g., values written to the range) associated with the write transaction may be discarded and/or otherwise dropped from the range. As write intents are generated by the transaction layer as a part of one or more write requests of a write transaction, the transaction layer may check for newer (e.g., more recent) committed values at the KVs of the range on which the write transaction is operating. If newer committed values exist at the KVs of the range, the write transaction may be restarted. Alternatively, if the write transaction identifies write intents at the KVs of the range, the write transaction may proceed as a transaction conflict as to be described herein. The transaction record may be addressable using the transaction's unique ID, such that requests can query and read a transaction's record using the transaction's ID.

In some embodiments, for read transactions, the transaction layer may execute a read transaction for KVs of a range indicated by the read transaction. The transaction layer may execute the read transaction if the read transaction is not aborted. The read transaction may read MVCC values at the KVs of the range. Alternatively, the read transaction may read intents written at the KVs, such that the read transaction may proceed as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternatively, the transaction layer may determine the transaction record to indicate the state as pending or staging. Based on the transaction record indicating the write transaction is in a pending state, the transaction layer may set the transaction record to staging and determine whether the write intents of the write transaction have succeeded (e.g., succeeded by replication to the other nodes storing replicas of the range). If the write intents have succeeded, the transaction layer may report the commit of the transaction to the transaction coordinator operating at the gateway node. The gateway node may send an indication of a successful commit of the write transaction to the client device that initiated the write transaction.

In some embodiments, based on committing a write transaction, the transaction layer may cleanup the committed write transaction. A coordinating node to which the write transaction was directed may clean up the committed write transaction via the transaction layer. A coordinating node may be a node that stores a replica of a range that is the subject of the transaction. In some cases, a coordinating node may be the gateway node for the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents written for new versions of keys by the write transaction to MVCC (e.g., committed) values by removing the pointer to the transaction record. In some cases, the coordinating node may resolve the write intents written for new versions of keys by the write transaction to MVCC (e.g., committed) values using time bound iteration to filter and avoid reading keys having timestamps less than a target timestamp or external to a target timestamp range, thereby reducing an amount of time required to resolve the write intents. Based on removing the pointer to the transaction record for the write transaction, the coordinating node may delete the write intents of the transaction. Based on the deletion of each of the write intents for the transaction, the transaction record may be deleted. Additional features for a commit protocol are described at least in U.S. patent application Ser. No. 18/316,851, filed on May 12, 2023, and published as U.S. Patent Application Publication No. 2024/0378191 on Nov. 14, 2024, which is hereby incorporated by reference herein in its entirety.

In some embodiments, the transaction layer may track timing of transactions (e.g., to maintain serializability). The transaction layer may implement hardware logical clocks (HLCs) to track time within the cluster. An HLC may be composed of a physical component (e.g., which may be close to local actual time) and a logical component (e.g., which is used to distinguish between events with the same physical component). HLC time may always be greater than or be equal to the actual time. Each node may include a local HLC, such that the cluster operates based on locally distributed clocks operating at individual nodes.

For a transaction having a per-transaction read snapshot scope, the gateway node (e.g., the node that initially receives a transaction from a client device) may determine a timestamp for the transaction and constituent requests (e.g., requests derived from a transaction) based on an HLC time for the node. For example, the gateway node may determine and assign a timestamp for the transaction to be equal to an HLC time of the gateway node at which the gateway node received the transaction. For a transaction having a per-statement read snapshot scope, the gateway node (e.g., the node that initially receives a transaction) may determine a timestamp for each received statement of the transaction and constituent requests of each statement based on an HLC time for the node. For example, the gateway node may determine a timestamp for a statement of the transaction to be equal to an HLC time of the gateway node at which the gateway received the statement of the transaction. The transaction layer may enable transaction timestamps based on HLC time. A timestamp within the cluster may be used to track versions of KVs (e.g., through MVCC as to be described herein) and provide guaranteed transactional isolation. A timestamp for a write intent as described herein may be equal to the assigned timestamp of a transaction corresponding to the write intent when the write intent was written to storage. A timestamp for a write intent corresponding to a transaction may be less than or equal to a commit timestamp for a transaction. When a timestamp for a write intent is less than a commit timestamp for the transaction that wrote the write intent (e.g., based on advancing the commit timestamp due to a transaction conflict or a most-recent timestamp indicated by a timestamp data structure), during asynchronous intent resolution, the committed, MVCC version of the write intent may have its respective timestamp advanced to be equal to the commit timestamp of the transaction.

For a transaction, for a node sending a request for the transaction to another node, the node may include the timestamp for the request that was generated by the local HLC (e.g., the HLC of the node) with the sent request. Based on receiving a request from another node (e.g., sender node), a node (e.g., receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve read requests for data stored by the leaseholder, where the read requests of the read transaction that reads the data having an HLC timestamp greater than or equal to the HLC timestamp of the MVCC value read by the read transaction (e.g., such that the read occurs after the write).

To provide isolation within the cluster, based on a request of a transaction reading a value of a range via a read request, the transaction layer may store the request's timestamp in a timestamp data structure (e.g., timestamp cache) stored at the leaseholder replica of the range. For each read request directed to a range, the timestamp cache may record and include an indication of the latest timestamp (e.g., the timestamp that is the furthest ahead in time) at which value(s) of the range that were read by a read request of a transaction. Based on execution of a write transaction, the transaction layer may compare the timestamp of the write transaction to the latest timestamp indicated by the timestamp cache. If the timestamp of the write transaction is less than the latest timestamp indicated by the timestamp cache, the transaction layer may attempt to advance the timestamp of the write transaction forward to a new, later timestamp that is greater than the latest timestamp indicated by the timestamp cache. In some cases, advancing the timestamp may cause the write transaction to restart in the second phase of the transaction as to be described herein with respect to read refreshing.

In some embodiments, according to replication (e.g., database, table, index, etc.) zone configurations, non-voting replicas may be placed in database regions that do not include a voting replica. To reduce latencies in a multi-region database, non-voting (e.g., follower) replicas may be made available to serve historical (e.g., stale) read requests originating from client devices located within their respective database region, such that read requests may be routed from a gateway node to a local follower node for a respective range and do not need to be directed to the leaseholder node for the respective range. A historical (e.g., stale) read request may include a read timestamp that is sufficiently in the past (e.g., such that write transactions have completed propagating to non-voting replicas). Accordingly, follower reads may be consistent reads at historical (e.g., stale) timestamps from non-leaseholder replicas of a range, which may be enabled by closed timestamp updates. A closed timestamp update may be a data store-wide timestamp, where the timestamp can include per-range information indicative of Raft (e.g., consensus) progress among a leader replica (e.g., typically the leaseholder replica) and follower (e.g., voting) replicas. A leader node for a range may send (e.g., periodically) a closed timestamp update to one or more follower nodes storing replicas of the range, where the closed timestamp update includes a closed timestamp indicative of the time at which the range was most recently updated and/or otherwise modified according to the consensus (e.g., Raft) protocol. Based on received closed timestamp updates, a follower node storing a follower replica for range may have the necessary information to serve consistent, non-stale reads for read requests directed to the range having read timestamps that are less than or equivalent to the received closed timestamp from the leader replica and serve stale reads for read requests directed to the range having timestamps that are above the received closed timestamp. Accordingly, in some embodiments, follower nodes storing follower replicas for a range may serve read requests when follower reads are enabled. For ranges configured as non-blocking ranges, follower replicas may serve consistent reads at a present time based on receiving a closed timestamp update with a synthetic timestamp. Examples of applications of closed timestamp updates, follower reads, and non-blocking transactions can be found in at least U.S. patent application Ser. No. 17/371,403, filed on Jul. 9, 2021, now issued as U.S. Pat. No. 11,860,860 on Jan. 2, 2024, which is hereby incorporated by reference in its entirety.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a transaction coordinator. The transaction coordinator may perform one or more operations as a part of the transaction layer. Based on the execution of a transaction, the transaction coordinator may send (e.g., periodically send) "heartbeat" messages to a transaction record for the transaction. These messages may indicate that the transaction should keep executing (e.g., be kept alive). If the transaction coordinator fails to send the "heartbeat" messages, the transaction layer may modify the transaction record for the transaction to an aborted status. The transaction coordinator may track each written KV and/or written span of KVs during execution of a transaction. In some embodiments, the transaction coordinator may clean and/or otherwise clear accumulated transaction operations. The transaction coordinator may clear an accumulated write intent for a write transaction based on the status of the transaction changing to committed or aborted.

As described herein, to track the status of a transaction during execution, the transaction layer can write to a transaction record corresponding to the transaction. Write intents of the transaction may route conflicting transactions to the transaction record based on the pointer to the transaction record included in the write intents, such that the conflicting transaction may determine a status for conflicting write intents as indicated in the transaction record. The transaction layer may write a transaction record to the same range as the first key subject to a transaction. The transaction coordinator may track the first key subject to a transaction. In some cases, the transaction layer may generate the transaction record when one of the following occurs: the write request commits; the transaction coordinator sends heartbeat messages for the transaction; or a request forces the transaction to abort. As described herein, a transaction record may have one of the following states: pending, committed, staging, or aborted. In some cases, the transaction record may not exist. If a transaction encounters a write intent where a transaction record corresponding to the write intent does not exist, the transaction may use the timestamp of the write intent to determine how to proceed with respect to the observed write intent. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration configured based on a time period for sending "heartbeat" messages. For example, the transaction liveness threshold may be a duration lasting for five "heartbeat" message time periods, such that after five missed heartbeat messages, a transaction may be aborted. The transaction record for a committed transaction may remain until each of the write intents of the transaction are converted to committed MVCC values stored on persistent storage of a node.

As described herein, in the transaction layer, values may not be written directly to the storage layer as committed MVCC values during a write transaction. Values may be written in a provisional (e.g., uncommitted) state referred to as a write intent. Write intents may be MVCC values including a pointer to a transaction record to which the MVCC value belongs. Based on interacting with a write intent (instead of a committed MVCC value), a request may determine the status of the transaction record, such that the request may determine how to interpret the write intent. As described herein, if a transaction record is not found for a write intent, the request may determine the timestamp of the write intent to evaluate whether or not the write intent may be considered to be expired.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be referred to as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory (e.g., stored by volatile, non-persistent storage) data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (e.g., requests originating from statements of transactions) to acquire locks, where the locks may exist for durations longer than the duration of the requests themselves. The locks may extend the duration of the isolation provided over specific keys of ranges stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed to execute. The concurrency manager may include information for external locks (e.g., the write intents).

In some embodiments, one or more locks may not be controlled by the concurrency manager, such that one or more locks may not be discovered during sequencing. As an example, write intents (e.g., replicated, exclusive locks) may be stored such that they may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica on which the first write request of a transaction occurred may contain the transaction record.

As described herein, databases stored by the cluster may be read and written using one or more "requests." A transaction may be composed of one or more statements (e.g., SQL statements), where each statement includes one or more requests, such as read requests and write requests. A read request may be a request to read data stored by a range, such as a value of a particular key at a timestamp corresponding to the request. A write request may be a request to write (e.g., update or modify) data stored by a range, such that the write request writes a value for a key included in the range. For example, a write request may write a value for a new version of a key. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, locks may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests R1 and R2 contend on key K2, but R1 is also waiting at key K1, R2 may be determined to have priority over R1, such that R2 may be executed on K2.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may receive and serialize write requests for the range. Serializing the requests may group the requests into a consistent order. To enforce the serialization, the leaseholder may create a "latch" for the keys in the write value, such that a write request may be given uncontested access to the keys. If other requests access the leaseholder for the same set of keys as the previous write request, the other requests may wait for the latch to be released before proceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transactions if serializability violations are possible. In some embodiments, the transaction layer may execute transactions at an isolation level different from a serializable isolation level. In some cases, the transaction layer may execute transactions at other isolation levels, such as a read committed isolation level and a snapshot isolation level.

In some embodiments, the transaction layer may allow for one or more transaction conflict types, where a conflict type may result from a transaction encountering and/or otherwise interacting with a write intent at a key (e.g., at least one key). A write/write conflict may occur when two concurrent transactions attempt to write to (e.g., create write intents for) the same key. A write/read conflict may occur when a read request of a transaction encounters an existing write intent with a timestamp less than or equal to the timestamp of the read request. To resolve the transaction conflict, the transaction layer may proceed through one or more operations. Based on a transaction within the transaction conflict having a defined transaction priority (e.g., high priority, low priority, etc.), the transaction layer may abort the transaction with lower priority (e.g., in a write/write conflict) or advance the timestamp of the transaction having a lower priority (e.g., in a write/read conflict). Based on a transaction within the conflicting transactions being expired, the expired transaction may be aborted. A transaction may be considered to be expired if the transaction does not have a transaction record or the timestamp for the transaction is outside of the transaction liveness threshold. A transaction may be considered to be expired if the transaction record corresponding to the transaction has not received a "heartbeat" message from the transaction coordinator within the transaction liveness threshold. A transaction (e.g., a low priority transaction) that is required to wait on a conflicting transaction may enter the TWQ as described herein.

In some embodiments, the transaction layer may allow for one or more additional conflict types that do not involve write intents. A read/write conflict (also referred to herein as a "write after read conflict") may occur when a write transaction having a lower timestamp conflicts with a read transaction having an equal or higher timestamp. The timestamp of the write transaction may be advanced to be greater than the timestamp of the read transaction, such that the write transaction may execute. A read within an uncertainty interval (also referred to as an "uncertainty window") may occur when a read transaction encounters a KV having a higher timestamp than the timestamp of the read transaction and there exists ambiguity whether the KV should be considered to be committed in the future or in the past of the read transaction. An uncertainty interval may be configured based on the maximum allowed offset (e.g., maximum allowed difference in time) between the clocks (e.g., HLCs) of any two nodes within the cluster. In an example, a duration of the uncertainty interval may be equal to the maximum allowed offset, where the uncertainty interval is defined as (t, t+d], where t refers to the initial timestamp of the read transaction and d refers to the duration of the uncertainty interval. A read within an uncertainty interval may occur based on clock skew between clocks operating on different nodes. In some cases, the transaction layer may advance the timestamp of the read transaction to be greater than the timestamp of the KV according to read refreshing as described herein. If the read transaction associated with a read within an uncertainty interval has to be aborted and retried, the read transaction may never encounter an uncertainty interval on any node which was previously visited by the read transaction. In some cases, there may not exist an uncertainty interval for KVs read from the gateway node of the read transaction. An amount of work to be aborted and retried may depend on a read snapshot scope and corresponding isolation level for a transaction. A first transaction that adheres to an isolation level having a per-statement read snapshot scope may only be required to abort and retry an individual statement of the first transaction while a second transaction that adheres to an isolation level having a per-transaction read snapshot scope may be required to abort and retry all statements of the transaction. When a first transaction adheres to an isolation level having a per-statement read snapshot scope, an amount of work aborted and retried by the first transaction may be relatively less work than a second transaction that adheres to an isolation level having a per-transaction read snapshot scope.

In some embodiments, as described herein, the TWQ may track all transactions that could not advance another blocking, ongoing transaction that wrote write intents observed by the tracked transactions. The transactions tracked by the TWQ may be queued and may wait for the blocking transaction to complete before the transaction can proceed to execute. The structure of the TWQ may map a blocking transaction to the one or more other transactions that are blocked by the blocking transaction via the respective unique IDs corresponding to each of the transactions. The TWQ may operate on the leader replica of a range, where the leader replica includes the transaction record based on being subject to the first write request included in the blocking, ongoing transaction. Based on a blocking transaction resolving (e.g., by committing or aborting), an indication may be sent to the TWQ that indicates the queued transactions blocked by the blocking transaction may begin to execute. A blocked transaction (e.g., a transaction blocked by a blocking transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by second write intents of a second transaction and the second transaction may be blocked by first write intents of the first transaction. If transactions are deadlocked (e.g., blocked on write intents of another transaction), one of the deadlocked transactions may randomly abort, such that the remaining, active (e.g., alive) transaction may execute and the deadlock may be removed. A deadlock detection mechanism may identify whether transactions are deadlocked and may cause one of the deadlocked transactions to abort.

In some embodiments, the transaction layer may enable read refreshing. When a timestamp of a transaction has been advanced to a new, later timestamp, additional considerations may be required before the transaction may commit at the advanced timestamp. The considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit at the advanced timestamp. A transaction may perform the check at a commit time if the transaction was advanced by a different transaction or by the timestamp cache. A transaction may perform the check based on encountering a read within an uncertainty interval or a write/write conflict. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leader replicas (e.g., combined leaseholder and leader replicas) to follower replicas in parallel, such that waiting for a commit occurs at transaction commit time. Transaction pipelining may include one or more operations. In transaction pipelining, for each received statement (e.g., including one or more requests) of a transaction, the gateway node corresponding to the transaction may communicate with the leaseholders (L1, L2, L3, . . . , Li) for the range(s) indicated by the transaction. Each leaseholder Li may receive the communication from the gateway node and may perform one or more operations in parallel. Each leaseholder Li may cause the respective leader replica for the range(s) to (i) create write intents, and (ii) send the write intents to corresponding follower nodes for the leader replica. After sending the write intents to the corresponding follower nodes, each leader replica may cause the respective leaseholder Li to send an indication to the transaction coordinator on the gateway node that the write intents have been sent. Replication of the intents may be referred to as "in-flight" once the leader replica sends the write intents to the follower replicas. Before committing the transaction (e.g., by updating the transaction record for the transaction via a transaction coordinator), the gateway node may wait for the write intents to be replicated in parallel to each of the follower nodes of the leader nodes. Based on receiving responses from the leader nodes and leaseholder nodes that the write intents have propagated to the follower nodes, the gateway node may commit the transaction by causing an update to the status of the transaction record of the transaction. Additional features of distributed consensus (e.g., Raft) operations are described with respect to "Transaction Execution."

Replication Layer

In some embodiments, the database architecture for the cluster may include a replication layer. The replication layer may copy data (e.g., ranges) between nodes of the cluster and enable consistency between the copied data based on a consensus protocol as described herein. The replication layer may allow the cluster to tolerate a subset of nodes going offline and/or otherwise being unavailable, such that the range data stored by the cluster is still available to client devices. The replication layer may receive requests from the distribution layer (e.g., from the DistSender as described herein). The replication layer may send responses (e.g., Batch Responses) to the distribution layer (e.g., the DistSender). In the replication layer, if the node receiving a request is the leaseholder for the range, the node may accept the request. If the node receiving a request is not the leaseholder for the range, the node may return an error to the source of the request, where the error may include an indication of a pointer to the leaseholder (or node last known to be the leaseholder) based on lease information available to the node. The KV requests may be converted to Raft commands. The replication layer may write accepted requests to a storage layer as to be described herein. Committed Raft commands may be written to the Raft log and stored on a storage medium of a node via the storage layer. The leaseholder may serve reads from the storage layer.

In some embodiments, the replication layer may apply a consensus protocol. The consensus protocol may require a threshold number (e.g., a quorum or a majority) of replicas of a range to confirm a modification (e.g., a write transaction) to the range prior to committing the modification. Based on the consensus protocol, the replication layer may require at least 3 nodes to include a replica of a range, such that a threshold number of replicas may agree to a modification to the range. In some cases, if the threshold number of replicas required to confirm a modification is a majority of the replicas, the replication layer may enable the database to tolerate a number of node failures as described by Equation 1:

$$\text{Tolerable Node Failures} = \frac{\text{Replication Factor} - 1}{2} \tag{1}$$

As described in Equation 1, a "Replication Factor" may be a number of replicas of a range stored by the cluster. For example, based on a "Replication Factor" equal to five nodes, the replication layer may tolerate node failure for two nodes of a cluster, where the failed nodes each store a replica of a range and three other nodes that are online and available store replicas of the range. In some cases, the "Replication Factor" may be configured at the cluster, database, and/or table level, where a cluster may store one or more databases and a database may include one or more ranges distributed among the nodes of the cluster.

In some embodiments, as described herein, the replication layer may include a consensus protocol (referred to as Raft). Raft may be an algorithm (e.g., distributed consensus algorithm) that stores data among one or more nodes of the cluster, such that the nodes may approve of the state of the data based on reaching consensus. Raft may organize the nodes storing a replica of a range in a group referred to as a Raft group as described herein. Each replica of a Raft group may be classified as a leader replica or a follower replica as described herein. The leader replica may coordinate writes to the follower replicas of the Raft group. The leader replica may send "heartbeat" messages to the follower replicas (e.g., periodically). The leader replica may be elected by follower replicas as to be described herein. Based on the absence of "heartbeat" messages from the leader replica, follower replicas may become candidates for the leader replica. Based on receiving a Batch Request for a range, a node may convert the KV operations indicated by the Batch Request into one or more Raft commands. The node may send the Raft commands to the Raft leader (e.g., if the node that received the Batch Request is not the leader replica). Based on receiving the Raft commands, the leader node may write the Raft commands to the Raft log as to be described herein.

In some embodiments, based on a threshold (e.g., a majority) of nodes writing a transaction and the writes being committed by the leader replica, the writes may be appended to the Raft log as described herein. The Raft log may be an ordered set of commands agreed on by a threshold number of replicas of the range. The Raft log may be a source of truth for consistent replication among nodes of the cluster. In some cases, each replica can be "snapshotted", such that a copy of the data stored by the replica may be generated for a specific applied log index. This copy of the data (e.g., a snapshot) may be sent to other nodes during a rebalance event to enable and/or expedite replication. A rebalance event may update data stored by a node to a specific log index based on the snapshot. Based on loading the snapshot, a node may be updated based on executing operations (e.g., indicated by the Raft log) that have occurred since the snapshot was taken.

In some embodiments, as described herein, a single node in the Raft group may be configured as the leaseholder node. The leaseholder node may be the only node that can serve reads to a client device or propose writes to the Raft leader node (e.g., both actions may be received as Batch Requests from DistSender as described herein with respect to "Distribution Layer"). When serving reads, the leaseholder may bypass the Raft protocol. The leaseholder may bypass the Raft protocol based on the consensus previously achieved for the values stored by the range. In most embodiments, the leaseholder and the leader replica may be the same replica stored on a node of the range, such that write requests may be proposed directly to the leaseholder/leader replica. The replication layer may attempt to collocate the leaseholder and leader replica during each lease renewal or transfer. If a leaseholder is not configured for a range, any node receiving a request may send a request to become the leaseholder for the range. The request may be sent to each node storing a replica of the range, with the nodes voting to reach consensus for the node to become the leaseholder. A node that sends a request to become the leaseholder may include a copy of the last valid lease stored by the node. If the last valid lease is equivalent to the current configured leaseholder, the request may be granted by a replica in response to receiving the request. Alternatively, if the last valid lease is not equivalent to the current configured leaseholder, the request may be ignored and/or otherwise denied by a replica.

In some embodiments, to manage leases for ranges included in tables as table data, the replication layer may use "epochs." An epoch may be a period between a node joining a cluster and a node disconnecting from a cluster. To extend a lease (e.g., to remain leaseholder for a particular range), a leaseholder node must periodically update a liveness record corresponding to the node. The liveness record may be stored on a system range key by one or more nodes of the cluster. Based on disconnecting from the cluster, a node may fail to update the liveness record. An epoch may be considered to be changed based on a node disconnecting from the cluster and/or failing to update the liveness record, at which point any node storing a replica of the range may become the leaseholder for the range as described herein. The replication layer may cause a leaseholder node to lose the lease for a range based on the leaseholder node disconnecting from the cluster. In some cases, a leaseholder may not be required to renew a lease for a range. The leaseholder may lose the lease for a range based on disconnecting from the cluster. In some cases, additional or alternative techniques may be used to assign a leaseholder for a range.

In some embodiments, as described herein, meta ranges and/or system ranges may be stored as KV data. System ranges may be restricted from epoch-based leases. System ranges may use expiration-based leases. An expiration-based lease may expire at (or substantially close to) a timestamp. In some cases, a leaseholder for a system range may retain the expiration-based lease after the timestamp at which the expiration-based lease was configured to expire. The leaseholder for the system range may retain the expiration-based lease based on the leaseholder continuing to generate and/or otherwise propose Raft commands to a Raft group.

In some embodiments, the replication layer may enable leaseholder rebalancing. Each leaseholder for a cluster may consider (e.g., periodically consider) whether to transfer the lease to another replica of the range. In an example, a leaseholder may periodically determine whether to transfer the lease to another replica of the range every 10 minutes. Each leaseholder may be configured to transfer the lease for a range based on the number of requests from each locality (e.g., region) for the range, the number of leases on each node comprising the range, and/or the latency between localities. If replicas for a range are distributed among different localities, the replication layer may determine which replica of the cluster is optimized to be the leaseholder. In some cases, a replica may be suited to be the leaseholder based on providing the lowest latency to requests from client devices.

For leaseholder rebalancing, a leaseholder may track the number of requests received by the leaseholder from each locality of the cluster. The number of requests received by the leaseholder from each locality of the cluster may be tracked as an average (e.g., an exponentially weighted moving average). The average may determine the localities that most frequently send requests to the range. In some cases, for an exponentially weighted moving average, the locality that has recently requested the range most often may be assigned the greatest weight. Based on another locality requesting the range frequently, the moving average may cause the locality to be assigned the greatest weight.

For leaseholder rebalancing, the leaseholder may correlate each requesting locality's weight (e.g., the proportion of recent requests) to the locality of each replica by determining a similarity (e.g., similarity between country and/or region) between localities. For example, if the leaseholder received requests from gateway nodes in a region defined as the Central United States (e.g., Country=United States, Region=Central), the replication layer (or leaseholder) may assign the following weights to replicas as described in Table 1 as follows:

TABLE 1

| Replica # | Replica Locality | Replica Leaseholder Rebalancing Weight |
|---|---|---|
| 1 | Country = United States, Region = Central | 100% |
| 2 | Country = United States, Region = East | 50% |
| 3 | Country = Australia, Region = Central | 0% |

As shown in Table 1, the "Replica #" identified by 1, with a "Replica Locality" of the Central United States may be configured as 100% for "Replica Leaseholder Rebalancing Weight" based on having a match (e.g., a complete match) to the Country and the Region of the "Replica Locality." The "Replica #" identified by 2, with a "Replica Locality" of the East United States may be configured as 50% for "Replica Leaseholder Rebalancing Weight" based on having a match (e.g., a partial match) to the Country of the "Replica Locality." The "Replica #" identified by 3, with a "Replica Locality" of Central Australia may be configured as 0% for "Replica Leaseholder Rebalancing Weight" based on lacking a match with the Country and the Region of the "Replica Locality." Based on the assignment of rebalancing weights to the replicas of the range, the leaseholder may determine a rebalancing weight and latency corresponding to the leaseholder. The rebalancing weight and latency may be compared to the rebalancing weight and latency corresponding to the other replicas (e.g., as shown in Table 1) to determine an adjustment factor for each replica. In an example, the greater the disparity between weights and the larger the latency between localities, the more the replication layer may favor the node including the replica from the locality with the larger weight.

For leaseholder rebalancing, the leaseholder may evaluate each replica's rebalancing weight and adjustment factor for the localities with the largest weights. The leaseholder may transfer the lease to another replica (e.g., of the node having the largest weight and/or adjustment factor). The leaseholder may transfer the lease to the replica if transferring the lease is beneficial and/or viable.

In some embodiments, based on a change to the number of nodes of a cluster, replicas for a range may require rebalancing. The replicas may require rebalancing based on changing of the members of a Raft group (e.g., due to the change to the number of nodes of a cluster).

Rebalancing may enable optimal survivability and performance. Rebalancing may vary based on whether nodes are added to the cluster or removed from the cluster for the change to the number of nodes of the cluster. Based on nodes being added to the cluster, the added node(s) may communicate identifying information to the existing nodes of the cluster. The identifying information may include an indication that the added node(s) have available storage capacity. The cluster may rebalance replicas stored by the existing nodes to the added node(s). A node may be removed from a Raft group of a cluster based on a lack of a response to the Raft group after a period of time. In an example, the period of time may be 5 minutes. Based on nodes being removed from the cluster (e.g., due to a lack of a response to the Raft group), nodes of the cluster may rebalance data stored by the removed node(s) to the remaining nodes of the cluster. Rebalancing may be enabled based on using a snapshot of a replica from the leaseholder. The snapshot may be sent to another node (e.g., over gRPC as described herein). Based on receiving and/or replicating the snapshot, the node with a replica (e.g., a replicated replica from the snapshot) may join the Raft group of the range corresponding to the replica. The node may determine the index of the added replica to lag one or more entries (e.g., the most recent entries) in the Raft log. The node may execute the actions indicated in the Raft log to update the replica to the state indicated by the most recent index of the Raft log. In some cases, replicas may be rebalanced based on the relative load stored by the nodes within a cluster.

Storage Layer

In some embodiments, the database architecture for databases stored by a cluster (e.g., cluster 102) of database nodes may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (e.g., table data, client data, etc.). For each node, a block cache may be shared between each store of the node. The store(s) of a node may store a collection of replicas of ranges as described herein, where a particular replica may not be replicated among stores of the same node (or the same node), such that a replica may only exist once on a particular node.

In some embodiments, as described herein, the storage layer may use an embedded KV data store (e.g., Pebble). The KV data store may be used with an application programming interface (API) to read and write data to storage devices (e.g., persistent storage devices) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamps may be used to differentiate between different versions of data (e.g., KVs) by tracking commit timestamps for the data. HLC timestamps may be used to identify a garbage collection expiration for a value as to be described herein. In some cases, the storage layer may support time travel queries (e.g., queries directed to MVCC versions of keys at previous timestamps). Time travel queries may be enabled by MVCC versions of keys.

In some embodiments, the storage layer may aggregate MVCC values (e.g., garbage collect MVCC values) to reduce the storage size of the data stored by the storage (e.g., the persistent storage) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

In some embodiments, a storage layer as described herein may be an embedded KV store. The storage layer may enable the cluster to read data from and write data to storage device(s) of each node. As described herein, data may be stored as KV pairs on the storage device(s) using a storage engine. The storage layer may provide atomic write batches and snapshots, which can indicate a subset of transactions. In some cases, the storage layer may operate a log-structured merge (LSM) tree at each node of the cluster to manage data storage, where each node stores replicas of one or more ranges of a database within the LSM tree. In some cases, other types of data storage structures, such as a B-tree, may be used in addition or in place of an LSM tree at each node.

In some cases, the LSM tree is a hierarchical tree including a number of levels. For each level of the LSM tree, one or more files may be stored on persistent storage (e.g., disk storage, solid-state drive (SSD) storage, etc.) that include the data referenced at that respective level. The files may be sorted string table (SST) files as described herein. In some cases, SST files are an on-disk (e.g., on persistent, non-volatile storage such as disk storage, SSD storage, etc.) representation of sorted lists of KV pairs. SST files can be immutable, such that they are never modified (e.g., even during a compaction process) after being written and instead are deleted and rewritten.

Database Architecture

Referring to FIG. 1, an illustrative distributed computing system 100 is presented. The computing system 100 may include a cluster 102. In some cases, the computing system 100 may include one or more additional clusters 102 (not shown in FIG. 1). The cluster 102 may include one or more (e.g., a number of) nodes 120 distributed among one or more geographic regions 110. The geographic regions may correspond to cluster regions and database regions as described further below. A node 120 may be a computing device (e.g., a server computing device). In some cases, a node 120 may include at least portions of the computing system as described herein with respect to FIG. 6. As an example, a node 120 may be a server computing device. A node may store replicas of one or more ranges, where one or more SST files stored by the node 120 include the data (e.g., KV data) of the range. A region 110 may correspond to a particular building (e.g., a data center), city, state/province, country, geographic region, and/or a subset thereof. In some cases, each region 110 may be a distinct, non-overlapping geographic region. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110*a*, 110*b*, and 110*c*. In some cases, the cluster 102 may include one region 110. In an example, the region 110*a* may be the Eastern United States, the region 110*b* may be the Central United States, and the region 110*c* may be the Western United States. Each region 110 of the cluster 102 may include one or more nodes 120. In some cases, a region 110 may not include any nodes 120. The region 110*a* may include nodes 120*a*, 120*b*, and 120*c*. The region 110*b* may include the nodes 120*d*, 120*e*, and 120*f*. The region 110*c* may include nodes 120*g*, 120*h*, and 120*i*.

Each node 120 of the cluster 102 may be communicatively coupled via one or more networks 112 and 114. In some cases, the cluster 102 may include networks 112*a*, 112*b*, and 112*c*, as well as networks 114*a*, 114*b*, 114*c*, and 114*d*. The networks 112 may include a local area network (LAN), wide area network (WAN), and/or any other suitable network. In some cases, the one or more networks 112 may connect nodes 120 of different regions 110. The nodes 120 of region 110*a* may be connected to the nodes 120 of region 110*b* via a network 112*a*. The nodes 120 of region 110*a* may be connected to the nodes 120 of region 110*c* via a network 112*b*. The nodes 120 of region 110*b* may be connected to the nodes 120 of region 110*c* via a network 112*c*. The networks 114 may include a LAN, WAN, and/or any other suitable network. In some cases, the networks 114 may connect nodes 120 within a region 110. The nodes 120*a*, 120*b*, and 120*c* of the region 110*a* may be interconnected via a network 114*a*. The nodes 120*d*, 120*e*, and 120*f* of the region 110*b* may be interconnected via a network 114*b*. In some cases, the nodes 120 within a region 110 may be connected via one or more different networks 114. The node 120*g* of the region 110*c* may be connected to nodes 120*h* and 120*i* via a network 114*c*, while nodes 120*h* and 120*i* may be connected via a network 114*d*. In some cases, the nodes 120 of a region 110 may be located in different geographic locations within the region 110. For example, if region 110*a* is the Eastern United States, nodes 120*a* and 120*b* may be located in New York, while node 120*c* may be located in Massachusetts. In some cases, the nodes 120 forming the cluster 102 may store and operate one or more workloads. A workload may be a database including one or more ranges corresponding to a particular tenant (e.g., group of users). Different workloads operated by different tenants may be stored by the nodes 120 on one or more shared disks and/or one or more separate disks, such as virtual disks as described herein.

In some embodiments, the computing system 100 may include one or more client devices 106. The one or more client devices 106 may include one or more computing devices. In some cases, the one or more client devices 106 may each include at least portions of the computing system as described herein with respect to FIG. 6. In an example, the one or more client devices 106 may include laptop computing devices, desktop computing devices, mobile computing devices, tablet computing devices, and/or server computing devices. As shown in FIG. 1, the computing system 100 may include client devices 106*a*, 106*b*, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 to the nodes 120. The one or more networks 111 may include a LAN, a WAN, and/or any other suitable network as described herein. As an example, the client devices 106 may communicate with the nodes 120 via a SQL client (e.g., an application) operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster. In some cases, one or more applications may operate on the client devices 106, such that the application(s) may interface with the nodes 120 to access, modify, and/or retrieve stored KV data. Tenant(s) of the database(s) stored by the cluster 102 may interact with their databases using the client devices 106.

Transaction Execution

In some embodiments, as described herein, distributed transactional databases stored by the cluster (e.g., cluster 102) of database nodes may enable receipt and execution one or more transactions. Each transaction may include one or more requests directed to performing one or more operations. The one or more requests may include read requests and/or write requests. In some cases, a request may be a query (e.g., a SQL query). A request may traverse one or more nodes of a cluster to execute the request. A request may interact with (e.g., sequentially interact with) one or more of the following: a SQL client, a load balancer, a gateway node, a leaseholder node, and/or a leader node as described herein.

A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder node may be a node that serves read requests and coordinates write requests for a range of keys (e.g., keys indicated in the request) as described herein. Serving a read request may include reading, by a request, a value(s) of stored keys and sending the read values from the node on which the values were stored to the transaction coordinator for the transaction corresponding to the request, where the transaction coordinator for the transaction can operate on a gateway node that originally received the transaction (e.g., from a client device). A leader node may be a node that maintains consensus among the replicas for a range via coordination of a consensus protocol.

A SQL client (e.g., operating at a client device 106*a*) may send a request (e.g., a SQL request) to a cluster (e.g., cluster 102). The request may be sent over a network (e.g., the network 111). A load balancer may determine a particular node of the cluster to which to send the request. The node (operating as the gateway node for the client) may be a node of the cluster that is closest to the SQL client (e.g., having the lowest latency and/or having the closest geographic location) to the computing device on which the SQL client is operating. A gateway node (e.g., a node 120*a*) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. In some cases, a query plan may be generated and selected as described further in U.S. patent application Ser. No. 18/090,994, filed on Nov. 29, 2022, and published as U.S. Patent Application Publication No. 2024/0220498 on Jul. 4, 2024, which is hereby incorporated by reference herein in its entirety. A transaction coordinator operating on a gateway node may perform one or more operations as a part of the transaction layer. The transaction coordinator may cause execution of KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender) operating on the gateway node.

A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (e.g., the leaseholder node(s)) that should receive requests corresponding to the operations for the range. The DistSender may identify and determine the node(s) (e.g., the leaseholder node(s)) that should receive requests corresponding to the operations for the range based on leaseholder information available to the DistSender at the gateway node. The leaseholder information may identify, for each range stored by the cluster, the nodes storing replicas of that range, the leaseholder node storing the leaseholder replica for that range, the leader node storing the leader replica for that range, and follower nodes storing the follower replicas for that range. The leaseholder information may be current as of a particular timestamp and may be updated as the nodes storing replicas of ranges change, such as changes in leaseholder and leader replicas. In some cases, leaseholder information may become out of date when the leaseholder information does not correctly identify the particular nodes storing particular replicas of a range. A first node may receive updated leaseholder information from a second, different node of the cluster, thereby causing the first node to update its leaseholder information with the timestamp at which the leaseholder information was updated.

In some embodiments, the DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write requests and values for read requests corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write request in the Batch Request may compare a timestamp of the write request to the timestamp cache. A timestamp cache may track the highest timestamp (e.g., most recent timestamp) for any read request that a given range has served. The comparison may ensure that the write request has a higher timestamp than any timestamp indicated by the timestamp cache. If a write request has a lower timestamp than any timestamp indicated by the timestamp cache, the write request may be restarted at an advanced timestamp that is greater than the value of the most recent timestamp indicated by the timestamp cache.

In some embodiments, operations indicated in the Batch Request may be serialized by a latch manager of a leaseholder node. For serialization, each write request may be given a latch on a row. Any read and/or write requests that arrive after the latch has been granted on the row may be required to wait for the write request to complete. Based on completion of the write request, the latch may be released and the subsequent requests can proceed to execute. In some cases, a batch evaluator may ensure that write requests are valid. The batch evaluator may determine whether the write request is valid based on the leaseholder node's data. The leaseholder's data may be evaluated by the batch evaluator based on the leaseholder node coordinating write requests to the range. If the batch evaluator determines the write request to be valid, the leaseholder node may send a provisional acknowledgement to the DistSender of the gateway node, such that the DistSender may begin to send subsequent Batch Requests for the range to the leaseholder.

In some embodiments, requests may read from the local instance of the storage engine as described herein to determine whether write intents are present at a key. If write intents are present at a particular key, a request may resolve write intents as described herein. If the request is a read request and write intents are not present at the key, the read request may read the value at the key of the leaseholder's storage engine. Read responses corresponding to a transaction may be aggregated into a Batch Response by the leaseholder. The Batch Response may be sent to the DistSender of the gateway node. If the request is a write request and write intents are not present at the key, the KV operations included in the Batch Request that correspond to the write request may be converted to distributed consensus (e.g., Raft) operations and write intents, such that the write request may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica) have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed). The gateway node may update the status of the transaction record for the transaction corresponding to the Raft operations to committed (e.g., explicitly committed). A latency for the above-described distributed consensus round may be equal to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write request included in the Batch Request. In some cases, the DistSender of the gateway node may aggregate read values for each read request included in the Batch Request. Based on completion of the operations of the Batch Request, the DistSender may record the success of each transaction in a corresponding transaction record. To record the success of a transaction, the DistSender may check the timestamp cache of the range where the first request of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Read Transaction Execution

Figure 2A:
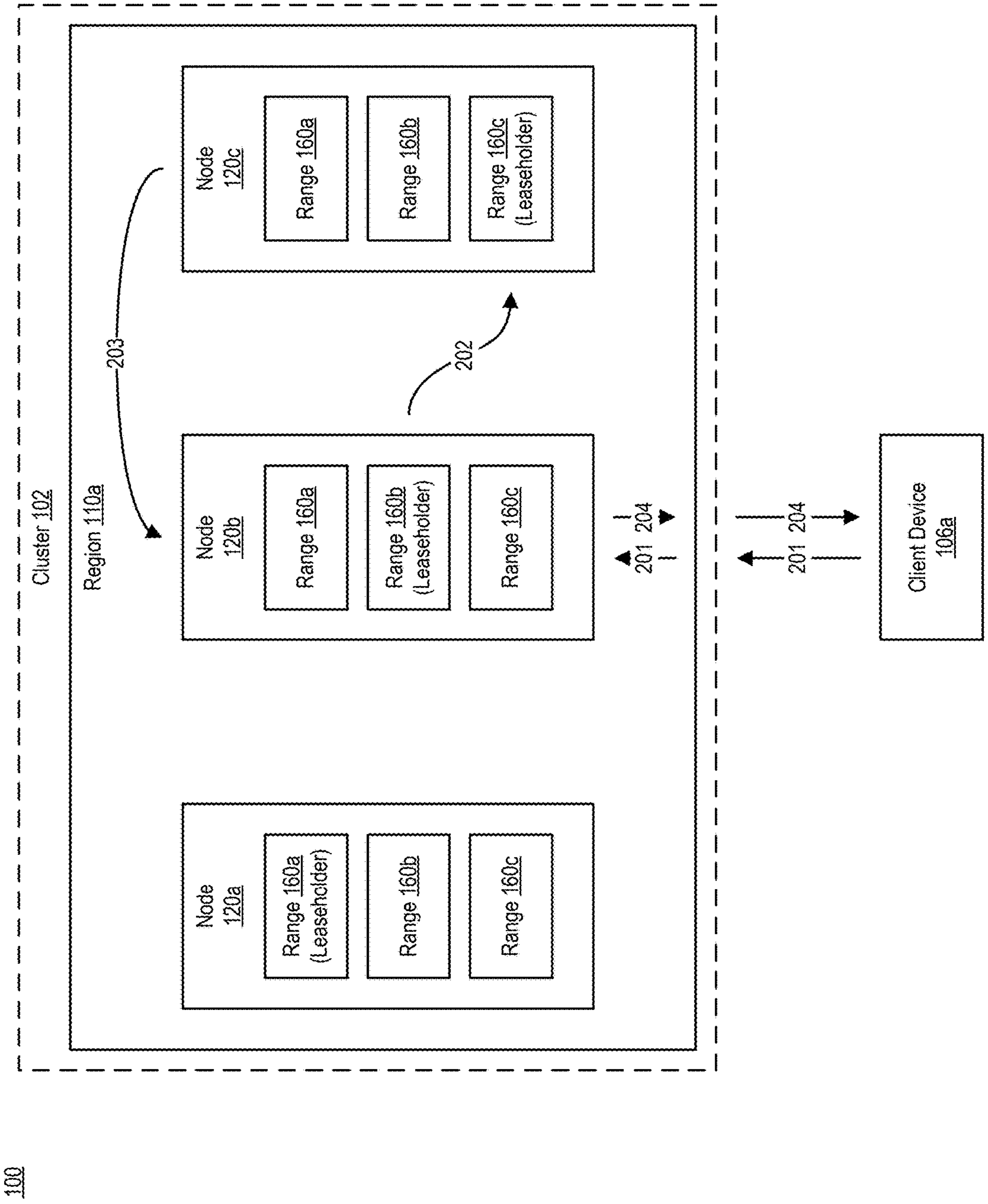
FIG. 2A shows an example of execution of a read transaction at the computing system, according to some embodiments.

Referring to FIG. 2A, an example of execution of a read transaction including at least one read request at the computing system 100 is illustrated. In some cases, the nodes 120*a*, 120*b*, and 120*c*, of the region 110*a* may include one or more replicas of the ranges 160. The node 120*a* may store and operate replicas of a first range 160*a*, a second range 160*b*, and a third range 160*c*, where each of the ranges 160*a*, 160*b*, and 160*c* are different ranges. The node 120*a* may store and operate the leaseholder replica for the range 160*a* (as indicated by "Leaseholder" in FIG. 2A). The node 120*b* may store and operate replicas of the first range 160*a*, the second range 160*b*, and the third range 160*c*. The node 120*b* may store and operate the leaseholder replica for range 160*b* (as indicated by "Leaseholder" in FIG. 2A). The node 120*c* may store and operate replicas of the first range 160*a*, the second range 160*b*, and the third 160*c*. The node 120*c* may store and operate the leaseholder replica for range 160*c* (as indicated by "Leaseholder" in FIG. 2A). While FIG. 2A is described with respect to communication between nodes 120 of a single region (e.g., region 110*a*), a read transaction may execute similarly using nodes 120 located within different geographic regions.

In some embodiments, a client device 106 may initiate a read transaction at a node 120 of the cluster 102 by sending the read transaction to the cluster 102. Based on the keys indicated by the read transaction, the node 120 that initially receives the read transaction (e.g., the gateway node) from the client device 106 may send the read request(s) of the read transaction to a node 120 storing and operating the leaseholder replica of the range 160 including the keys indicated by the read request(s). The node 120 storing and operating the leaseholder of the range 160 may receive and serve the read request(s) by reading a state of the data subject to the read request in its state machine and sending the read data to the gateway node. For example, the node 120 storing and operating the leaseholder of the range 160 may serve the read requests by reading the values of the keys subject to the read request and sending the read keys and values to the gateway node. The gateway node may receive the read data and may send the read data to the client device 106.

As shown in FIG. 2A, at step 201, the client device 106 may send a read transaction to the cluster 102. A node 120*b* functioning as the gateway node may receive the read transaction from the client device 106. The node 120*b* may be a node 120 of the cluster 102 that is located closest to the client device 106, with the closeness between the nodes 120 and the client device 106 being defined, for example, by a latency and/or a proximity as described herein. The read transaction may include at least one request directed to reading data stored by the range 160*c*. At step 202, the node 120*b* may send the read request(s) of the received read transaction to the node 120*c*. The read request(s) may be sent to the node 120*c* based on the node 120*c* being the leaseholder of the range 160*c*. The node 120*c* may receive the read request(s) from the node 120*b* and serve the read request(s) by reading a state of the data from the range 160*c* in the state machine of the node 120*c*. At step 203, the node 120*c* may send the read data from the range 160*c* to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If the node 120*b* had been configured to store and operate the leaseholder for the range 160*c* in place of the node 120*c*, the node 120*b* may have served the read data to the client device 106*a* directly after step 201, without sending the read request(s) of the read transaction to the node 120*c*.

Write Transaction Execution

Figure 2B:
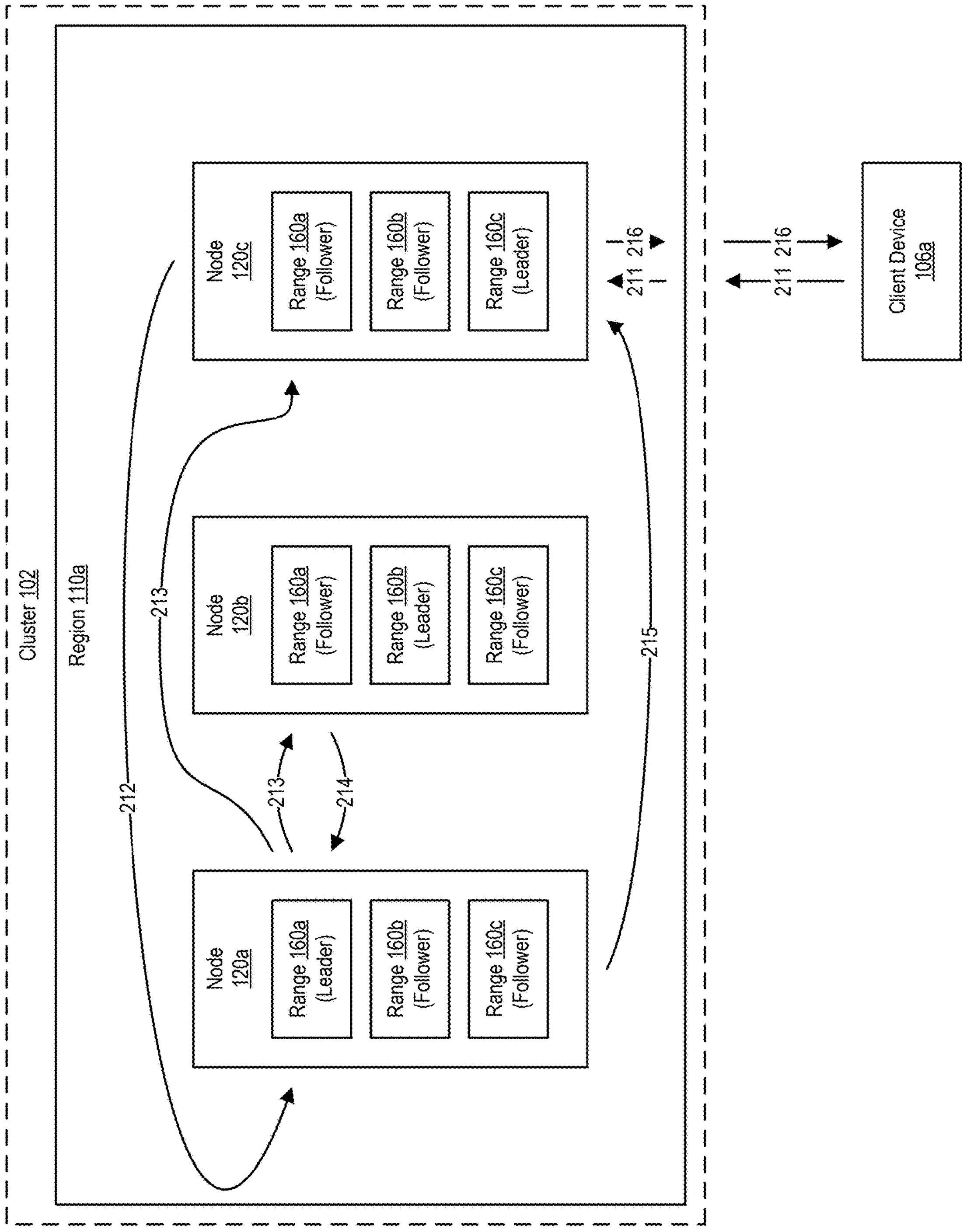
FIG. 2B shows an example of execution of a write transaction at the computing system, according to some embodiments.

Referring to FIG. 2B, an example of execution of a write transaction including at least one write request at the computing system 100 is presented. In some cases, as described herein, the nodes 120*a*, 120*b*, and 120*c*, of the region 110*a* may include one or more replicas of ranges 160. The node 120*a* may store and operate replicas of a first range 160*a*, a second range 160*b*, and a third range 160*c*, where each of the ranges 160*a*, 160*b*, and 160*c* are different ranges. The node 120*a* may store and operate the leaseholder replica and the leader replica for range 160*a* (as indicated by "Leaseholder" in FIG. 2A and "Leader" in FIG. 2B). The node 120*b* may store and operate replicas of the first range 160*a*, the second range 160*b*, and the third range 160*c*. The node 120*b* may store and operate the leader replica for range 160*b* (as indicated by "Leader" in FIG. 2B). The node 120*c* may store and operate replicas of the first range 160*a*, the second range 160*b*, and the third range 160*c*. The node 120*c* may store and operate the leader replica for range 160*c* (as indicated by "Leader" in FIG. 2B). While FIG. 2B is described with respect to communication between nodes 120 of a single region (e.g., region 110*a*), a write transaction may execute similarly using nodes 120 located within different geographic regions.

In some embodiments, a client device 106 may initiate a write transaction at a node 120 of the cluster 102 by sending the write transaction to the cluster 102, with the write transaction including at least one write request. Based on the keys indicated by the write transaction (e.g., the keys to which the write request(s) are directed), the node 120 that initially receives the write transaction (e.g., the gateway node) from the client device 106 may send the write request(s) of the write transaction to a leaseholder replica of the range 160 including the keys indicated by the write transaction. The node 120 storing and operating the leaseholder replica of the range 160 may receive and send the write request(s) to the node 120 storing and operating the leader replica of the range 160. In most cases, the leaseholder of the range 160 and the leader replica of the range 160 are configured to be same replica stored and operated on the same node 120. The node 120 storing and operating the leader replica may send the write request(s) to the corresponding nodes 120 storing and operating the follower replicas of the range 160 for replication, write intent(s) corresponding to the write request(s) to the leader replica, and append the write request(s) to a Raft log for the leader replica operated by the node 120. The node 120 storing and operating the leader replica may only append the write request(s) to its Raft log once a threshold number (e.g., a majority) of the nodes 120 storing and operating the replicas of the range (e.g., including the leader nodes and follower nodes) agree to append the write request(s) to their respective Raft logs by acknowledging the write request(s). The nodes 120 storing and operating the follower replicas of the range may receive the write request(s) from the node 120 storing and operating the leader replica, send acknowledgment of receipt of the write request(s) to the node 120 storing and operating the leader replica, append the write request(s) to the corresponding Raft logs for the follower replicas operated by the nodes, write intent(s) corresponding to the appended write request(s) to the follower replicas, and send an indication to the node 120 storing and operating the leader replica that the write request(s) were appended. The nodes 120 storing and operating the follower replicas of the range may only append the write request(s) to their respective Raft logs after sending an acknowledgment of receipt of the write request(s) to the node 120 storing and operating the leader node and receiving an indication from the node 120 storing and operating the leader replica to append the write requests to their Raft logs. Based on a threshold number (e.g., a majority) of the nodes 120 storing and operating the replicas acknowledging and/or sending an acknowledgment to the node 120 storing and operating the leader replica that the write request(s) were received and/or appended, the node 120 storing and operating the leader replica may commit the write transaction (e.g., by appending the write request(s) to its Raft log) by modifying a state of the range(s) in its state machine to which the write request(s) were directed. The node 120 storing and operating leader replica may send an indication to the nodes 120 storing and operating follower replicas to commit the write request(s) (e.g., by appending the write request(s) to their Raft logs) and the write transaction. In some cases, write requests of the write transaction may be considered committed when appended to the leader replica's Raft log. The node 120 storing and operating leader replica may send an acknowledgement of a commit of the write request(s) and the write transaction to the node 120 storing and operating leaseholder, and the node 120 storing and operating leaseholder may send the acknowledgement to the gateway node. The gateway node may send the acknowledgement to the client device 106. In some cases, the leaseholder node and/or the leader node may generate a log entry for a write request based on performing request evaluation as described herein. The log entry may be sent to follower nodes and appending to Raft logs as described herein in place of a write request.

As shown in FIG. 2B, at step 211, the client device 106 may send a write transaction to the cluster 102. A node 120*c* functioning as the gateway node may receive the write transaction from the client device. The node 120*c* may be a node 120 of the cluster 102 that is located closest to the client device 106, with the closeness between the nodes 120 and the client device 106 being defined, for example, by a latency and/or a proximity as described herein. The write transaction may include at least one write request directed to writing to data stored by the range 160*a*. At step 212, the node 120*c* may send the write request(s) of the received write transaction to the node 120*a*. The write transaction may be sent to the node 120*a* based on the node 120*a* being the leaseholder node and storing the leaseholder replica of the range 160*a*. Based on the leaseholder replica stored by the node 120*a* also being configured as the leader replica for the range 160*a*, the leader replica of range 160*a* may perform request evaluation and append a generated log entry corresponding to the write request to a Raft log at node 120*a*. At step 213, the leader replica may synchronously (e.g., simultaneously) send the log entries to the follower replicas of range 160*a* stored and operating on the node 120*b* and the node 120*c*, respectively. The node 120*b* and the node 120*c* may receive the log entries and append the log entries to their respective Raft logs. At step 214, the follower replicas of the range 160*a* operating at the nodes 120*b*, 120*c* may send an indication to the leader replica of the range 160*a* that the log entries were appended to their Raft logs. Based on a threshold number of replicas indicating the log entries were appended to their Raft logs, the leader replica and follower replicas of the range 160*a* may commit the write request(s) and the write transaction by modifying states of their replicas of the range in their respective state machines according to the write request(s) (e.g., log entries generated for the write request(s)). At step 215, the node 120*a* may send an acknowledgement of the committed write transaction to the node 120*c*. At step 216, the node 120*c* may send the acknowledgement of the committed write transaction to the client device 106*a* to complete the write transaction.

Exemplary Method for Write Request Processing for a Consensus Group

In some embodiments, as described herein at least with respect to FIG. 2B, the cluster 102 may receive write requests (e.g., included in write transactions) from client devices 106 directed to writing to data stored in one or more ranges 160. For example, a write request may include instructions to write to the values of a number of keys included in a range 160 and/or add new values to keys included in the range 160. In some cases, the client devices 106 may correspond to more than one tenant, such that different tenants may access and interact with their associated ranges 160 stored by the cluster 102. Accordingly, write requests included in transactions sent to the cluster 102 by a client device 106 may include an indicator of a tenant $t_j$ associated with the write requests and an indicator of a range $r_i$ the write requests are intended to modify. Similarly, read requests may include an indicator of a tenant $t_j$ associated with the read requests and an indicator of a range $r_i$ the read requests are intended to read from.

Figure 3:
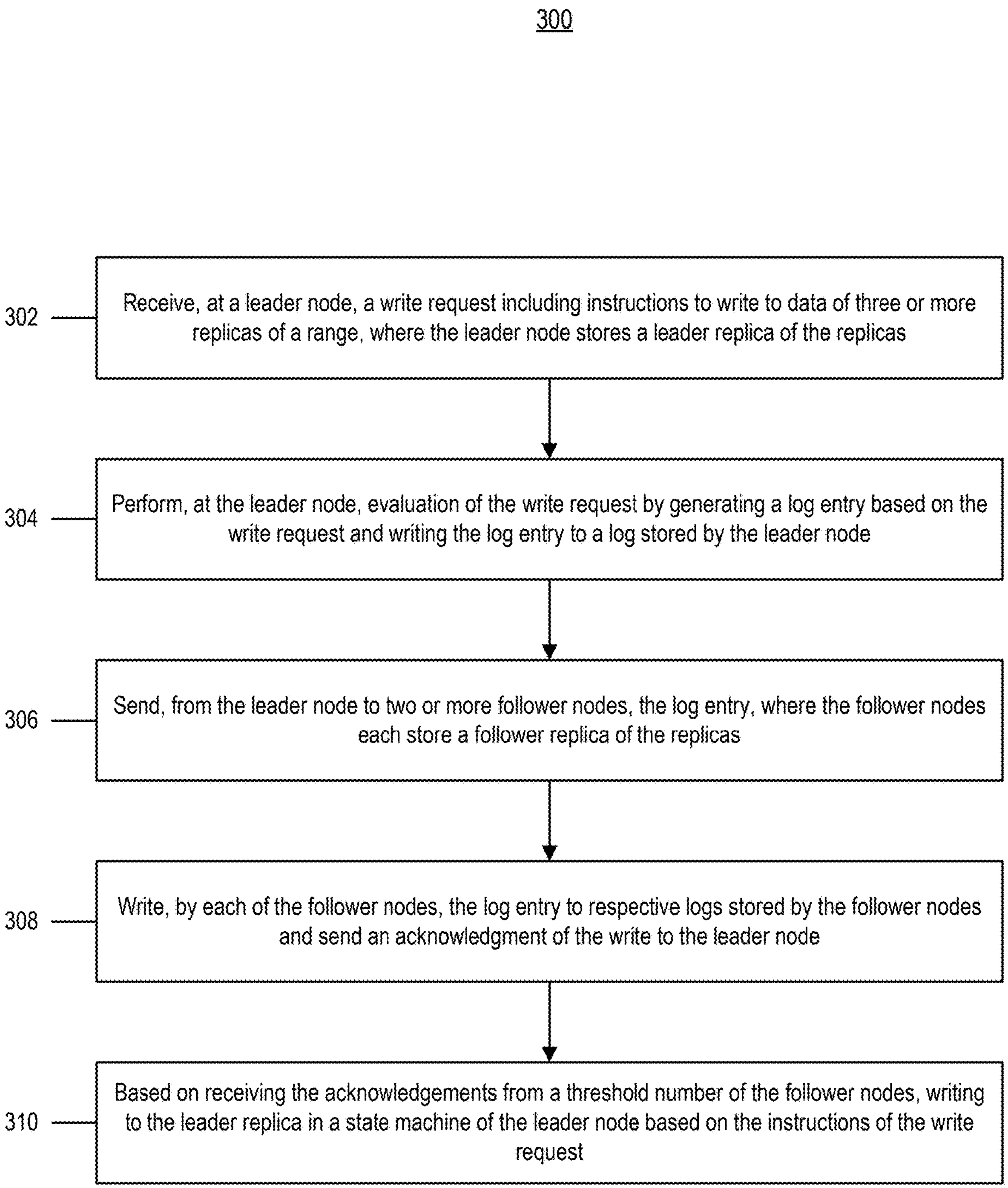
FIG. 3 shows an exemplary flowchart of a method for processing a write request using a consensus protocol, according to some embodiments.

In some embodiments, as described herein, a consensus group for a particular partition (e.g., range) may execute a consensus protocol to execute and commit write requests to the replicas of the range. The consensus group can include the leader replica and the follower replicas of the range, which form the voting replicas of the range. Each range can have a respective consensus group of replicas used to commit write requests including instructions to the replicas of the range. Referring to FIG. 3, an exemplary flowchart of a method 300 for processing a write request using a consensus protocol is illustrated. While the method 300 is described with respect to a single write request including instructions to write to a range replicated among three replicas and having a failure tolerance of one node storing a replica, the method 300 may be executed in parallel by a number of consensus groups for a number of write requests and increased numbers of replicas may be included in a consensus group to provide additional tolerance to node failures. A client device 106 may send the write request to the cluster 102 as a part of a transaction including one or more requests. A gateway node may receive the transaction as described herein and may route the write request to a leaseholder node storing the leaseholder replica for a range to which the write request is directed. In some cases, the leaseholder replica may also be the leader replica for the range.

At step 302, a leader node (e.g., node 120*a*) storing a leader replica for a range can receive a write request including instructions to write (e.g., modify) to data of three or more replicas of the range, where the leader node stores a leader replica of the replicas. The write request can include an indicator of a tenant $t_j$ associated with the write request and an indicator of the range $p_i$. In some cases, the node can receive the write request from a leaseholder node for the range and/or from a gateway node that originally received the transaction including the write request from the client device. A leaseholder node storing a leaseholder replica of the range and/or a gateway node may send the write request to the leader node. Two or more follower nodes may store two or more follower replicas of the replicas of the range, where each follower node may store a respective follower replica of the two or more follower replicas. For example, at least first and second follower nodes (e.g., nodes 120*b* and 120*c*) may store respective follower replicas of the range. The leader node may sequence the write request for evaluation and execution based on FIFO semantics and/or timestamps as described herein. In some cases, the leader node may sequence the write request for evaluation and execution using FIFO semantics, such that a first write request that is received by the leader node before a second write request is ordered for evaluation and execution before the second write request. In some cases, the leader node may sequence write requests for execution based on the timestamps associated with the write requests as described herein, such that a first write request having a first timestamp that is earlier than a second timestamp of a second write request is sequenced for evaluation and execution before the second write request. In some cases, the leader node may sequence requests for execution according to queuing techniques described further in U.S. patent application Ser. No. 18/046,693, which is hereby incorporated by reference herein in its entirety.

At step 304, the leader node may perform evaluation of the write request (also referred to as "request evaluation") to generate a log entry based on the write request, where the log entry is configured to be appended to the respective Raft logs stored by the leader node and follower nodes. The log entry may include instructions indicating the write (e.g., updates and/or modifications) to be made to the data included in the replicas of the range, such as updates to particular data (e.g., value(s) of key(s)) stored by the range.

Based on performing request evaluation, the leader node may write the log entry to the Raft log stored by the leader node. The written log entry may be assigned an index $i_k$ indicative of a position of the log entry within the Raft log. The leader node may order (e.g., sequence) the log entry for execution after previous log entries that were previously added to the Raft log before the log entry. In some cases, request evaluation may include acquiring locks on data (e.g., key(s) and respective value(s)) of the range that is to be modified based on the instructions included in the write request. In some cases, request evaluation may include acquiring one or more latches on data (e.g., key(s) and respective value(s)) of the range that is to be modified based on the instructions included in the write request. In some cases, request evaluation may not end (and the method may not proceed to step 306) until existing locks and/or latches applied to data to be modified based on the write request are removed and/or otherwise released by other (e.g., previous and/or on-going) write requests. In some cases, a write request can depend on an existing state of the range to be modified by the write request in the state machine of the leader node storing a replica of the range. Accordingly, in some cases, request evaluation can include reading a state of the data to be modified based on the write request in the leader node's state machine, computing the mutation to be applied to the data by the write request, and then generating the log entry for the write request that considers the state of the data to be modified. For example, request evaluation can include reading respective value(s) of key(s) to be modified based on the instructions included in the write request. As a non-limiting example, a write request can be configured to subtract the integer 5 from a value of the integer 99 mapped to key "key1". Accordingly, evaluation of that write request can include reading the value of key1, performing the subtraction, determining the resulting value for key 1 will be the integer 94, and generating the log entry for the write request that simplifies the write request from causing subtraction from the existing value of key1 to writing the integer 94 as the value mapped to key1.

At step 306, the leader node may send the log entry to each of the follower nodes. Based on receiving the log entry, each follower node (if available) may write the log entry to their respective stored Raft log. In some cases, one or more of the follower nodes may have failed and/or otherwise be offline, such that they are unable to write the log entry to their respective stored Raft log.

At step 308, based on receiving the log entry from the leader node, each follower node may write the log entry to their respective Raft log. Each follower node that successfully wrote the log entry to their respective Raft log may send instructions to the leader node, with the instructions including acknowledgement of the write of the log entry to the Raft log. The leader node may receive the instructions including the acknowledgements from the follower nodes.

At step 310, based on receiving the acknowledgements of the write of the log entry from at least a threshold number of the follower nodes, the leader node may modify a state of the leader replica in its state machine based on the modification(s) included in the instructions of the log entry. The threshold number of nodes may be a majority number of the follower replicas minus one. For example, when the two or more follower replicas include four follower replicas (e.g., such that the consensus group includes five total replicas), the threshold number of nodes may be two follower nodes. In some cases, based on a majority number of the leader node and the follower nodes writing the log entry to their Raft log and/or sending acknowledgements of the write, respectively, the leader node may (i) modify a state (e.g., value(s) of key(s)) of the leader replica in its state machine according to the instructions included in the log entry and (ii) send a communication to the follower nodes (e.g., available follower nodes) to modify a state of the follower replicas in their respective state machines according to the instructions included in the log entry. The follower nodes may receive the communication from the leader node and may modify, based on receiving the communication, the state of the follower replicas according to the instructions included in the log entry. Additional features for use of a consensus protocol within a commit protocol are described at least in U.S. patent application Ser. No. 18/316,851.

In some embodiments, each of the replicas stored by a particular node may be stored in a state data store of the node and Raft logs for each of the replicas stored by the node may be stored in a log data store of the node. In some cases, the state data store and the log data store of a particular store may be combined in a single shared data store (e.g., such as an LSM tree). At each node storing one or more replicas of one or more ranges, physical computing resources of the node may be shared among the state data store and the log data store, such that the node may store, for example, hundreds to thousands of ranges that share the physical computing resources of the node.

Quorum Flow Admission Control for Write Request Processing for a Consensus Group In some embodiments, the method 300 for processing a write request by a consensus group may execute simultaneously for a number of write requests corresponding to higher priority, regular work originating from a number of client devices for a number of tenants and/or lower priority, elastic work such as index backfill operations and bulk write operations. Simultaneous execution of the method 300 for a number of write requests can cause high utilization of physical computing resources at individual nodes, thereby constraining performance to execute the operations of the method 300 with reduced latencies. Further, simultaneous execution of the method 300 for a number of write requests originating from a number of different tenants can cause unequal (e.g., unfair) utilization of the physical computing resources, such that first transactional operations including instructions to execute first write requests for a first tenant operates with higher performance relative to second transactional operations including instructions to execute of second write requests for a second tenant.

As described herein, conventional distributed computing systems fail to account for and mitigate the overutilization of physical computing resources at nodes storing follower replicas of consensus groups. Further, conventional distributed computing systems fail to promote performance isolation between tenants and/or workloads that have ranges stored by the same node, such that tenants are provided unequal access to physical computing resources at nodes storing follower replicas of consensus groups. Finally, conventional distributed computing systems fail to pace replication of already evaluated write requests, such that stores of nodes can become overloaded by executing log entries written to their write logs. Accordingly, improved systems and methods are provided for controlling resource utilization for consensus-based distributed groups of replicas, such that replication to follower replicas is paced to adhere to requirements for inter-tenant fair sharing and intra-tenant priorities.

In some embodiments, to account for and remedy the deficiencies of conventional distributed computing systems, a cluster may implement quorum flow admission control techniques by introducing evaluation and send token pools for use among nodes of consensus groups and tenants corresponding to the consensus groups. A "stream" as referenced herein can refer to a pair of a tenant and store of a node to which a leader node replicates write requests and corresponding log entries, with the leader node storing the leader replica for a range associated with the tenant identified by the stream. A stream may be represented as (<tenant>, <store>), with <tenant> referring to a particular tenant and <store> referring to a store of a node that stores a replica of a range associated with that particular tenant. In some cases, a "local stream" as referenced herein can refer to a stream for a leader node, with the stream identifying a tenant and a store of the leader node to which the leader node replicates write requests and corresponding log entries. Accordingly, for a particular tenant, a leader node can track streams for each of the replicas of a range that form a consensus group and to which the leader node replicates write requests and log entries, including a leader replica for the range stored by the leader node. As an example, when a replication factor for a range associated with a tenant is three replicas (i.e., K=3), a leader node may track three streams associated with that tenant for its own store that stores the leader replica for that range and for the respective stores of two follower nodes that each store a follower replica of that range. In some cases, a "non-local stream" as referenced herein can refer to a stream for a follower node, with the stream identifying a tenant and a store of the follower node to which the leader node replicates write requests and corresponding log entries. Accordingly, for a particular tenant, a leader node can track streams for each of the replicas of a range that form a consensus group and to which the leader node replicates write requests and log entries, including a follower replica for the range stored by the follower node.

As an example of streams for a consensus group of three replicas (i.e., K=3), a leader node <node1> can have a store <store1>. The leader node can store a leader replica <replica1/range1> of a range <range1> in its store <store1>, with the range <range1> corresponding to a first tenant <tenant1>. A first follower node can store a follower replica <replica2/range1> of the range <range1> in its store <store2> and a second follower node can store a follower replica <replica3/range1> of the range <range1> in its store <store3>. Accordingly, for the consensus group of the replicas <replica1/range1>, <replica2/range1>, and <replica2/range1>, the leader node can track the streams represented as (<tenant1>, <store1>), (<tenant1>, <store2>), and (<tenant1>, <store3>), with the stream represented as (<tenant1>, <store1>) being a local stream for the leader node.

To implement quorum flow admission control techniques, evaluation token pools are introduced for each stream tracked by a leader node. The leader node can maintain and operate two evaluation token pools for each stream, with the two evaluation token pools including a first evaluation token pool corresponding to regular work and a second evaluation token pool corresponding to elastic work. Accordingly, for a consensus group including three voting replicas, a group of six evaluation token pools may exist and be used for evaluation of write requests. As described herein, an evaluation token pool can be defined as corresponding to (i) a particular stream and (ii) either regular work or elastic work. Accordingly, different ranges that have leader replicas stored by the same store of the leader node, have follower replicas stored by the same stores of the follower nodes, and correspond to the same tenant can share evaluation token pools for regular work and elastic work. While quorum flow admission control techniques are described herein with respect to a consensus group of three voting replicas including one leader replica and two follower replicas, such description is one example of an implementation of quorum flow admission control techniques and the techniques may be adapted for any number of replicas in a consensus group, such as for five voting replicas including one leader replica and four follower replicas.

In some embodiments, each evaluation token pool can include a number of evaluation tokens, with evaluation tokens being deducted from and added to the evaluation token pool by the leader node over time as described herein. In some cases, the size of an evaluation pool may be defined by a number of evaluation tokens remaining in the evaluation token pool. In some cases, a number of evaluation tokens remaining in the evaluation token pool may be defined by a number of bytes. In some cases, an initial size of each of the evaluation token pools for a consensus group may be fixed (e.g., at 8 or 16 MiB) and the size of each of the evaluation token pools may change over time based on evaluation tokens that have been deducted from and/or added back to the evaluation token pools. In some cases, different evaluation token pools corresponding to regular work and elastic work may have the same size or different sizes. As an example, an evaluation token pool corresponding to regular work may have an initial size of 16 MiB, while an evaluation token pool corresponding to elastic work may have an initial size of 8 MiB. A write request and/or a corresponding log entry may cause deduction of evaluation tokens from an evaluation token pool and may cause replenishment of evaluation tokens back to an evaluation token pool as described further below. Consumption of evaluation tokens from an evaluation token pool may include removing, deducting, and/or otherwise subtracting the consumed evaluation tokens from the evaluation token pool, thereby reducing the size of the evaluation token pool (e.g., a number of available evaluation tokens). A particular evaluation token pool may range from a negative size (e.g., negative number of evaluation tokens) to a positive size (e.g., positive number of evaluation tokens). Replenishment of evaluation tokens to an evaluation token pool may include adding and/or introducing the replenished evaluation tokens to the evaluation token pool, thereby increasing the size of the evaluation token pool (e.g., a number of available evaluation tokens).

To implement quorum flow admission control techniques, send token pools are introduced for each non-local stream tracked by a leader node. The leader node can maintain and operate two send token pools for each non-local stream, with the two send token pools including a first send token pool corresponding to regular work and a second send token pool corresponding to elastic work. Accordingly, for a consensus group including three voting replicas, a group of four send token pools may exist and be used for pacing sending of log entries to follower nodes. As described herein, a send token pool tracked by a leader node can be defined as corresponding to (i) a particular non-local stream and (ii) either regular work or elastic work. Accordingly, different ranges that have leader replicas stored by the same store of the leader node, have follower replicas stored by the same stores of the follower nodes, and correspond to the same tenant can share send token pools for regular work and elastic work.

In some embodiments, each send token pool can include a number of send tokens, with send tokens being deducted from and added to the send token pool by the leader node over time as described herein. In some cases, a size of a send token pool may be defined by a number of send tokens remaining in the send token pool. In some cases, a number of send tokens remaining in the send token pool may be defined by a number of bytes. In some cases, an initial size of each of the send token pools for a consensus group may be fixed (e.g., at 8 or 16 MiB) and the size of each of the send token pools may change over time based on send tokens that have been deducted from and/or added back to the send token pools. In some cases, different send token pools corresponding to regular work and elastic work may have the same size or different sizes. As an example, a send token pool corresponding to regular work may have an initial size of 16 MiB, while a send token pool corresponding to elastic work may have an initial size of 8 MiB. A write request and/or corresponding log entry may cause deduction of send tokens from a send token pool and may cause replenishment of send tokens back to a send token pool as described further below. Consumption of send tokens from a send token pool may include removing, deducting, and/or otherwise subtracting the consumed send tokens from the send token pool, thereby reducing the size of the send token pool (e.g., a number of available send tokens). A particular send token pool may range from a negative size (e.g., negative number of send tokens) to a positive size (e.g., positive number of send tokens). Replenishment of send tokens to a send token pool may include adding and/or introducing the replenished send tokens to the send token pool, thereby increasing the size of the send token pool (e.g., a number of available send tokens).

In some embodiments, to implement quorum flow admission control techniques, a leader node storing a leader replica for a range can maintain and operate a send-stream for each of the replicas of a consensus group for the range. Accordingly, when a replication factor for a range is three replicas (i.e., K=3), a leader node can maintain and operate three separate send-streams for each of the leader replica stored by the leader node and two follower replicas stored by two follower nodes, respectively. For each send-stream corresponding to a replica of a range, that send-stream can be used to track evaluation and/or send tokens deducted from evaluation and/or send token pools corresponding to that replica.

As an example of send-streams for a consensus group of three replicas (i.e., K=3), a leader node <node1> can have a store <store1>. The leader node can store a leader replica <replica1/range1> of a range <range1> in its store <store1>, with the range <range1> corresponding to a first tenant <tenant1>. A first follower node can store a follower replica <replica2/range1> of the range <range1> in its store <store2> and a second follower node can store a follower replica <replica3/range1> of the range <range1> in its store <store3>. Accordingly, for the consensus group of the replicas <replica1/range1>, <replica2/range1>, and <replica2/range1>, the leader node can maintain send-streams for each of the replicas <replica1/range1>, <replica2/range1>, and <replica2/range1>.

In some embodiments, to implement quorum flow admission control techniques, a leader node storing a leader replica for a range can track a per-replica admitted vector. The leader node can track the admitted vector for each of the replicas of a consensus group for the range. For each of the replicas of the consensus group, the leader node can track the admitted vector that identifies the highest indexed log entry known to be admitted to the LSM storage system at the node storing that replica and the metadata for that log entry known to have been dequeued from the virtual admission queue operated at the node storing that replica. Such admitted vectors can be used with a send-stream for that replica to add previously deducted evaluation and/or send tokens for that send-stream back to the evaluation and/or send token pools corresponding to that replica. Thus, by tracking the log entries known to be admitted to the LSM tree storage system and metadata for those entries known to have been dequeued at each node, the leader node can identify log entries that have not been admitted to the LSM tree storage system and related metadata at each node and for which evaluation tokens and/or send tokens have been deducted from respective token pools. By tracking evaluation tokens and/or send tokens that have been deducted from respective token pools using the admitted vectors, the leader node can determine tokens to be added back to token pools (e.g., in the event of failure). In some cases, the admitted vector tracked for a particular replica may be tracked per-priority of log entries admitted to the LSM tree and/or metadata of log entries dequeued from virtual admission queues.

In some embodiments, to implement quorum flow admission control techniques, a leader node storing a leader replica for a range can maintain and operate an evaluation queue for streams corresponding to a consensus group of replicas for the range. In some cases, when the leader and leaseholder replicas for the consensus group are not the same replica, the leaseholder node can maintain the operate the evaluation queue and perform the operations of the leader node described herein with respect to the evaluation queue. In some cases, leader node can queue received write requests that are waiting for evaluation. To pace evaluation of received write requests, the leader node may only perform evaluation of a request when at least a majority of the evaluation token pools corresponding to the streams each have greater than a threshold size (e.g., number of evaluation tokens). Because a write request can only be evaluated when at least a majority of the evaluation token pools corresponding to the streams have greater than a threshold size, the leader node can queue a write request in the evaluation queue at least when less than the majority of the evaluation token pools corresponding to the streams have greater than the threshold size. Accordingly, when less than the majority of the evaluation token pools corresponding to the streams have greater than the threshold size, the leader node can queue one or more received write request directed to the stores of the streams and associated with the tenant of the streams in the evaluation queue while the leader node awaits for evaluation tokens to be added back to the remaining tokens of the evaluation token pools corresponding to the streams. The leader node can dequeue and evaluate a write request from the evaluation queue in response to determining at least the majority of the evaluation token pools corresponding to the streams have greater than the threshold size.

In some embodiments, to implement quorum flow admission control techniques, a leader node storing a leader replica for a range can maintain and operate a respective send queue at least for each of the follower replicas of a consensus group for the range. The leader node can store a respective send queue for each of the follower replicas of the range stored by respective follower nodes. In some cases, the leader node can manage the send queues for the consensus group within the send-streams for the consensus group. For each send queue corresponding to a follower node, the leader node can queue generated log entries within that send queue that are waiting to be sent to that follower node. To pace replication of write requests and corresponding log entries to follower nodes and prevent store overload at the stores of the follower nodes, the leader node may only send a log entry to a follower node for replication when a size (e.g., number of send tokens remaining in) of a send token pool is greater than a threshold size (e.g., number of send tokens, with the send token pool being for the stream representing the tenant and store of the follower node to which the log entry is to be replicated. Because a log entry can only be sent to a follower node when a size of a send token pool for that stream is greater than a threshold size, the leader node can queue a log entry in the send queue for that follower node when the size of the send token pool for that stream is less than or equal to a threshold size. Accordingly, when the size of the send token pool for that stream is less than or equal to a threshold size, the leader node can queue one or more log entries in the send queue that are waiting to be sent to the follower node while the leader node awaits for send tokens to be added back to the remaining tokens of the send token pool. The leader can dequeue a log entry from the send queue in response to determining when the size of the send token pool for that stream exceeds a threshold size.

In some embodiments, a leader node storing a leader replica for a range can maintain and operate a send queue at least for its leader replica of a consensus group for the range. The leader node can store the send queue. Because the leader node does not maintain and operate send token pools for a stream representing a store of the leader node, the leader node may not queue any generated log entries within its send queue and may queue metadata for the log entries for in a virtual admission queue operating at the node in response to causing consumption of evaluation tokens for the write requests corresponding to the generated log entries.

In some embodiments, to implement quorum flow admission control techniques, a leader node storing a leader replica for a range can operate a range controller for each range for which the leader node stores a leader replica. The leader node can use the range controller to implement the techniques described herein with respect to queueing write requests prior to evaluation, sending generated log entries to follower nodes storing follower replicas of the ranges for which the leader node stores leader replicas, and queuing generated log entries to be sent to follower nodes storing follower replicas of the ranges for which the leader node stores leader replicas. In some cases, the range controller may function as a container for send-streams.

Figure 4:
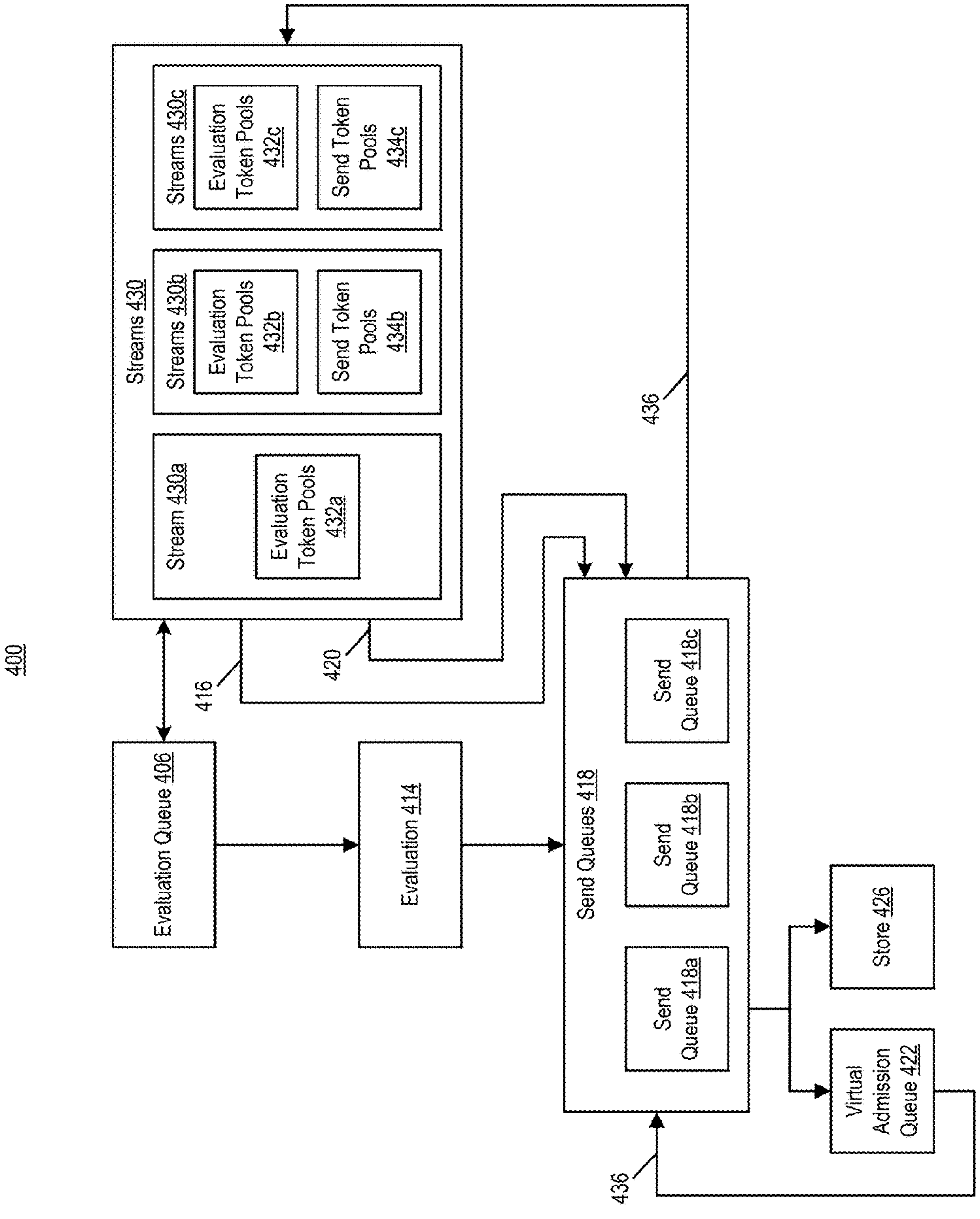
FIG. 4 shows an exemplary block diagram of an architecture of quorum flow admission control techniques, according to some embodiments.

Referring to FIG. 4, an exemplary block diagram 400 of an architecture of quorum flow admission control techniques is shown. The block diagram 400 is shown with respect to features implemented by a leader node of the cluster storing a leader replica of a particular range having a replication factor of three replicas. However, any suitable replication factor for replicas may be used based on a desired level of survivability. As shown in FIG. 4, the block diagram 400 includes an evaluation queue 406, request evaluation 414, send queues 418 including a first send queue 418*a*, second send queue 418*b*, and third send queue 418*c*, a virtual admission queue 422, and store 426 of the leader node, and streams 430 including a first stream 430*a*, second stream 430*b*, and third stream 430*c*. While not shown in FIG. 4, a virtual admission queue and respective store can exist for each of at least two follower nodes, such as first and second follower nodes as described herein. The first stream 430*a* corresponds to first and second evaluation token pools 432*a*, with the first evaluation token pool corresponding to regular work and the second evaluation token pool corresponding to elastic work. The first stream 430*a* may not correspond to any send token pools when the first stream 430*a* represents a store of a leader node, as the leader node can operate send token pools for only non-local streams. The second stream 430*b* corresponds to first and second evaluation token pools 432*b*, with the first evaluation token pool corresponding to regular work and the second evaluation token pool corresponding to elastic work. The second stream 430*b* corresponds to first and second send token pools 434*b*, with the first send token pool corresponding to regular work and the second send token pool corresponding to elastic work. The third stream 430*c* corresponds to first and second evaluation token pools 432*c*, with the first evaluation token pool corresponding to regular work and the second evaluation token pool corresponding to elastic work. The third stream 430*c* corresponds to first and second send token pools 434*c*, with the first send token pool corresponding to regular work and the second send token pool corresponding to elastic work. Accordingly, each stream 430 can correspond to a pair of evaluation token pools 432 and a pair of send token pools. As described herein, evaluation and send token pools corresponding to regular work may have an initial size of 16 MiB, while evaluation and send token pools corresponding to elastic work may have an initial size of 8 MiB. In some cases, evaluation and send token pools may have the same size or different sizes.

In some embodiments, as described with respect to at least the method 300, a leader node storing a leader replica for a range may receive a write request including instructions to write (e.g., modify) to data (e.g., value(s) of key(s)) included in the range. The leader node can receive the write request from a leaseholder node storing a leaseholder replica from the range when the leader and leaseholder replicas are not the same replica. The write request can include an indicator of a tenant $t_j$ associated with the write request, an indicator of the range $r_i$ to be written to based on the instructions of the write request, and/or a workload including the range $r_i$ to be written to based on the instructions of the write request. The write request may be a regular write request corresponding to regular work or an elastic write request corresponding to elastic work. In some cases, write request can include an indicator identifying the write request as a regular or elastic write request.

In response to receiving the write request, the leader node can determine whether to proceed to perform evaluation of the write request based on sizes of the evaluation token pools 432 for the streams 430 to which the write request is directed. A write request can be directed to a stream when the write request is (i) associated with a tenant represented by the stream and (ii) directed to writing to a replica stored by a store represented by the stream. As described herein, a write request can be configured to write to modify a state of a range in state machines of nodes storing replicas of the range. A write request configured to write to one or more KVs of one range can be directed to a number of streams 430 that is based on (e.g., equivalent to) a replication factor for the range. As an example, for a replication factor of three replicas (i.e., K=3), a write request can be directed to three streams corresponding to a consensus group of replicas, such that the leader node considers sizes of at least three evaluation token pools for those three streams when determining whether to evaluate the write request. In the example of FIG. 4, the write request can be directed to a range and associated with a tenant, with the leader node storing a leader replica of the range and two follower replicas each storing a follower replica of the range. The stream 430*a* can correspond to the leader node, such that the stream 430*a* represents a tenant and a store of the leader node storing the leader replica to which the write request is directed. The streams 430*b* and 430*c* can correspond to a first and second follower node, respectively, such that the stream 430*b* represents the tenant and a store of the first follower node storing the first follower replica to which the write request is directed and the stream 430*c* represents the tenant and a store of the second follower node storing the second follower replica to which the write request is directed.

In some cases, in response to receiving the write request and when the received write request corresponds to regular work, the leader node can determine the respective sizes of the evaluation token pools corresponding to regular work for the consensus group to determine whether at least a majority (i.e., quorum) of those evaluation token pools have greater than a threshold size. As an example, the leader node can determine the current sizes of each of the three evaluation token pools corresponding to regular work of the evaluation token pools 432*a*, evaluation token pools 432*b*, and evaluation token pools 432*b*. When the leader node determines at least a majority of the evaluation token pools corresponding to regular work for the consensus group have greater than a threshold size (e.g., a size >0 bytes), the leader node may proceed to perform evaluation of the write request. In some cases, the evaluation token pool of the evaluation token pools 432*a* corresponding to the leader node and regular work must be included in the majority of the evaluation token pools having greater than a threshold size for the leader node to proceed to perform evaluation of the write request.

When the leader node determines less than a majority of the evaluation token pools corresponding to regular work for the consensus group have greater than a threshold size (e.g., a size >0 bytes), the leader node may wait for a majority of the evaluation token pools corresponding to regular work for the consensus group to have greater than a threshold size and may not proceed to perform evaluation of the write request until evaluation tokens are replenished. For the write request, the leader node may not consume tokens from any of the evaluation token groups prior to performing evaluation of the write request based on (i) a size of the write request being unknown before the evaluation, and (ii) the evaluation potentially blocking other write requests via lock and/or latch acquisition for data (e.g., key(s) and respective value(s)) included in the range. By delaying consumption of tokens until after request evaluation, the leader node prevents starvation of tokens from other write requests that do not require locks and/or latches to proceed to execute. When the leader node determines less than a majority of the evaluation token pools corresponding to regular work for the consensus group have greater than a threshold size (e.g., a size >0 bytes), the leader node may queue the write request in the evaluation queue 406 with zero or more (e.g., one or more) other waiting write requests directed to the same streams 430 using any suitable queuing techniques. After queuing the write request in the evaluation queue 406, the leader node may dequeue a write request from the evaluation queue once at least a majority of the evaluation token pools corresponding to regular work for the consensus group have greater than a threshold size.

In some embodiments, in response to determining at least a majority of the evaluation token pools corresponding to regular work for the consensus group have greater than a threshold size, the leader node can optionally add the write request to a queue, such as a utilization queue (not shown in FIG. 4) operated by the leader node that queues write requests before performing evaluation of write requests based on a utilization of physical computing resources (e.g., CPU, non-volatile storage, volatile memory, etc.) at the node. Accordingly, the leader node can dequeue the write request from the utilization queue based on the utilization of physical computing resources (e.g., CPU, non-volatile storage, volatile memory, etc.) at the leader node being less than a particular threshold utilization. In some cases, in response to dequeuing the write request from the utilization queue, the leader node can perform request evaluation. In other cases, when the utilization queue is not used by the leader node, the leader node can perform request evaluation in response to determining at least a majority of the evaluation token pools corresponding to regular work for the consensus group have greater than a threshold size.

In some cases, in response to receiving the write request and when the received write request corresponds to elastic work, the leader node can determine the respective sizes of the evaluation token pools corresponding to elastic work for the consensus group to determine whether each of those evaluation token pools have greater than a threshold size. As an example, the leader node can determine the current sizes of each of the three evaluation token pools corresponding to elastic work of the evaluation token pools 432*a*, evaluation token pools 432*b*, and evaluation token pools 432*b*. When the leader node determines each of the evaluation token pools corresponding to elastic work for the consensus group have greater than a threshold size (e.g., a size >0 bytes), the leader node may proceed to perform evaluation of the write request.

When the leader node determines at least one of the evaluation token pools corresponding to elastic work for the consensus group does not have greater than a threshold size (e.g., a size >0 bytes), the leader node may wait for each of the evaluation token pools corresponding to elastic work for the consensus group to have greater than a threshold size and may not proceed to perform evaluation of the write request until evaluation tokens are replenished. When the leader node determines at least one of the evaluation token pools corresponding to elastic work for the consensus group does not have greater than a threshold size (e.g., a size >0 bytes), the leader node may queue the write request in the evaluation queue 406 with zero or more (e.g., one or more) other waiting write requests directed to the same streams 430 using any suitable queuing techniques. After queuing the write request in the evaluation queue 406, the leader node may dequeue a write request from the evaluation queue once at least a majority of the evaluation token pools corresponding to regular work for the consensus group have greater than a threshold size.

In some embodiments, in response to determining each of the evaluation token pools corresponding to elastic work for the consensus group have greater than a threshold size, the leader node can add the write request to a utilization queue 410 operated by the leader node that queues write requests before performing evaluation of write requests based on a utilization of physical computing resources (e.g., CPU, non-volatile storage, volatile memory, etc.) at the node. Accordingly, the leader node can dequeue the write request from the utilization queue based on the utilization of physical computing resources (e.g., CPU, non-volatile storage, volatile memory, etc.) at the leader node being less than a particular threshold utilization. In some cases, in response to dequeuing the write request from the utilization queue 410, the leader node can perform request evaluation.

In some embodiments, the leader node can perform request evaluation 414 in response to dequeuing the write request from the utilization queue 410, determining at least a majority of the evaluation token pools corresponding to regular work for the consensus group have greater than a threshold size, and/or determining each of the evaluation token pools corresponding to elastic work for the consensus group have greater than a threshold size. The leader node can perform request evaluation 414 by determining a size of a write request and generating a resulting log entry corresponding to the write request, with the size based on (e.g., equivalent to) (i) the size of the tokens the write request is configured to cause to be consumed from each of the evaluation and send token pools and/or (ii) an amount and/or size of data to be modified based on the instructions of the write request. For example, the leader node may determine the write request has a size of 1 MB, such that the write request is configured to cause consumption of 1 MB from the evaluation and send token pools for the write request.

In some embodiments, in response to performing request evaluation and when the write request corresponds to regular work, the leader node may cause consumption 416 of evaluation tokens from each of the evaluation token pools for the streams to which the write request is directed. For regular work, the leader node can cause consumption 416 of evaluation tokens from each of the evaluation token pools corresponding to regular and elastic work for the streams to which the write request is directed. The consumed tokens from each evaluation token pool can be equivalent to the determined size of the write request. In some cases, consumption of the evaluation tokens from an evaluation token pool may cause the evaluation token pool to have a negative size (e.g., a size <0).

In some embodiments, in response to performing request evaluation and when the write request corresponds to elastic work, the leader node may cause consumption 416 of evaluation tokens from each of the evaluation token pools for the streams to which the write request is directed. For elastic work, the leader node can cause consumption 416 of evaluation tokens from each of the evaluation token pools corresponding to only elastic work for the streams to which the write request is directed. Accordingly, regular write requests can cause consumption of evaluation tokens from evaluation token pools corresponding to both regular and elastic work, while elastic write requests can cause consumption of evaluation tokens from evaluation token pools corresponding to only elastic work.

In some embodiments, in response to causing consumption of evaluation tokens, the leader node can determine a number of queued log entries in each of the send queues 418 for the follower nodes to which the write request is directed to determine whether a majority of the send queues 418 for the follower nodes and leader node to which the write request is directed are empty. A send queue may be empty when it does not include any queued log entries waiting to be sent to follower nodes for replication purposes. As described herein, the send queue for the leader node may always be empty. When a majority of the send queues 418 for the follower nodes and leader node to which the write request is directed are empty, the leader node may proceed to cause execution of the write request. In some cases, the send queue for the leader node to which the write request is directed must be included in the majority of the send queues that are empty for the leader node to proceed to cause execution of the write request.

When a majority of the send queues 418 for the follower nodes and leader node to which the write request is directed are not empty, the leader node may proceed to force flush one or more of the send queues that are not empty. By force flushing one or more of the send queues that are not empty, the leader node can cause a majority of the send queues 418 for the follower nodes and leader node to which the write request is directed to be empty. To force flush a particular send queue, the leader node can dequeue and send each of the queued log entries in that send queue to the follower node to which the queued log entries are directed. By force flushing a send queue, the leader node can prevent delays to a consensus group achieving consensus by writing a log entry to their respective Raft logs, thereby preventing increases in latency from the use of send queues as described herein. To select a send queue to be force flushed from the send queues that are not empty, the leader node can use one or more of sizes of evaluation token pools and/or send token pools corresponding to the send queues that are not empty. As an example, the leader node can select a particular send queue for force flushing from the send queues that are not empty based on that send queue having an evaluation token pool and/or send token pool corresponding to elastic work having the greatest size of the evaluation token pools and/or send token pools corresponding to elastic work of the send queues that are not empty, implying the replica associated with that send queue is the least overloaded of the replicas.

In some embodiments, in response to causing consumption of evaluation tokens and for each send token pool 434 corresponding to regular work when the write request corresponds to regular work for the consensus group, the leader node can determine the respective size of that send token pool to determine whether that send token pool has greater than a threshold size (e.g., a size >0 bytes). As an example, the leader node can determine the current size of the send token pool corresponding to regular work of the send token pools **434*b*** to determine whether to send the generated log entry to the first follower node for replication. When the leader node determines that send token pool has greater than a threshold size (e.g., a size >0 bytes), the leader node may proceed to send the generated log entry to the follower node corresponding to that send token pool.

When the leader node determines that send token pool does not have greater than a threshold size (e.g., a size >0 bytes), the leader node can queue the log entry in the send queue corresponding to that send token pool and may not proceed to send the generated log entry to the follower node corresponding to that send token pool until send tokens are replenished for that send token pool. As an example, the leader node can queue the log entry in the send queue **418*b* corresponding to that send token pool 434*b***. For the queued log entry, the leader node may not consume tokens from any of the send token pools for the send queue in which the log entry is queued prior to sending to the log entry to the follower node corresponding to that send token pool. When a log entry is queued in a send queue, a priority level of the log entry may be reduced from a regular work priority level to an elastic work priority level. The leader node may queue the write request in the send queue with zero or more (e.g., one or more) other waiting log entries directed to the same follower node using any suitable queuing techniques. After queuing the log entry in the send queue, the leader node may dequeue a log entry from that send queue once the send token pool corresponding to elastic work and the follower node to which the write request is directed has greater than a threshold size.

In some embodiments, in response to causing consumption of evaluation tokens and for each send token pool 434 corresponding to elastic work when the write request corresponds to elastic work for the consensus group, the leader node can determine the respective size of that send token pool to determine whether that send token pool has greater than a threshold size (e.g., a size >0 bytes). As an example, the leader node can determine the current size of the send token pool corresponding to elastic work of the send token pools **434*b*** to determine whether to send the generated log entry to the first follower node for replication. When the leader node determines that send token pool has greater than a threshold size (e.g., a size >0 bytes), the leader node may proceed to send the generated log entry to the follower node corresponding to that send token pool.

When the leader node determines that send token pool does not have greater than a threshold size (e.g., a size >0 bytes), the leader node can queue the log entry in the send queue corresponding to that send token pool and may not proceed to send the generated log entry to the follower node corresponding to that send token pool until send tokens are replenished for that send token pool. As an example, the leader node can queue the log entry in the send queue 418*b* corresponding to that send token pool 434*b*. For the queued log entry, the leader node may not consume tokens from any of the send token pools for the send queue in which the log entry is queued prior to sending to the log entry to the follower node corresponding to that send token pool. After queuing the log entry in the send queue, the leader node may dequeue a log entry from that send queue once a send token pool corresponding to elastic work and the follower node to which the write request is directed has greater than a threshold size.

In some embodiments, in response to sending a log entry to a follower node and when the log entry corresponds to regular work, the leader node may cause consumption 420 of send tokens from each of the send token pools for the stream representing the follower node to which the log entry was sent. For regular work, the leader node can cause consumption 420 of send tokens from each of the send token pools corresponding to regular and elastic work for the stream representing the follower node to which the log entry was sent. The consumed tokens from each send token pool can be equivalent to the determined size of the write request. In some cases, consumption of the send tokens from a send token pool may cause the send token pool to have a negative size (e.g., a size <0).

In some embodiments, in response to sending a log entry to a follower node and when the log entry corresponds to regular work, the leader node may cause consumption 420 of send tokens from the send token pool for the stream representing the follower node to which the log entry was sent. For elastic work, the leader node can cause consumption 420 of send tokens from the send token pool corresponding to elastic work for the stream representing the follower node to which the log entry was sent. The consumed tokens from the send token pool can be equivalent to the determined size of the write request.

In some embodiments, the leader node can only queue a log entry in a send queue when queuing that log entry in the send queue will not cause less than a majority of the send queues 418 for the follower nodes and leader node to which the write request is directed to be empty. When queuing that log entry in the send queue will not cause less than a majority of the send queues 418 for the follower nodes and leader node to which the write request is directed to be empty, the leader node may proceed to queue the log entry in the send queue as described herein. When queuing that log entry in the send queue will cause less than a majority of the send queues 418 for the follower nodes and leader node to which the write request is directed to be empty, the leader node may proceed to force flush one or more of the send queues as described herein. The leader node may proceed to force flush one or more of the send queues that are not empty or the send queue that would be made not empty by queueing the log entry. By force flushing one or more of the send queues that are not empty, the leader node can cause a majority of the send queues 418 for the follower nodes and leader node to which the write request is directed to be empty.

In some embodiments, virtual admission queues can be adapted for use with the evaluation and send token pools used for controlling execution of write requests. Each node storing a replica included in a consensus group may operate a virtual admission queue, such that virtual admission queues are operated per-node (e.g., rather than per-stream, per-tenant, or per-workload). Accordingly, a number of virtual admission queues used by a particular consensus group may be equivalent to a number of replicas of a range configured to participate in the consensus protocol for committing write requests to the range. In some cases, virtual admission queues may be referred to as "virtual" based on not impacting execution of the consensus protocol as described at least with respect to the method 300. A virtual admission queue may be used to control replenishment of consumed evaluation and send tokens to particular evaluation and send token pools, respectively, corresponding to metadata for a log entry admitted from the virtual admission queue. For example, for a virtual admission queue operating at a follower node and queuing metadata for a log entry including instructions to write to a particular follower replica of a consensus group stored by that follower node, the follower node may cause replenishment of evaluation and send tokens to the token pools operated by the leader node for the stream representing the follower node (e.g., by sending a communication to the leader node to replenish evaluation and send tokens).

At each virtual admission queue, a node may queue metadata for respective log entries added to the Raft log(s) (e.g., each corresponding to a replica of a consensus group) stored at the node. A node may queue metadata for log entries corresponding to a number of different replicas of ranges in the individual virtual admission queue operated by the node, where the ranges can correspond to a number of tenants (e.g., different tenants) and/or workloads (e.g., different workloads). Further, a node may queue metadata for log entries corresponding to a number of different streams that are directed to the stores(s) of that node. A node may dequeue and admit metadata for a particular log entry corresponding to a particular Raft log from the virtual admission queue operating at the node based on one or more parameters. The one or more parameters may include utilization (e.g., mean utilization over a selected time period) of physical computing resources (e.g., CPU, non-volatile storage, volatile memory, etc.) at the node, a type of the physical computing resources at the node, and the tolerated latencies supported by workloads stored by the cluster (e.g., cluster 102) of nodes. In some cases, a node may dequeue and admit metadata for a particular log entry from the virtual admission queue operating at the node based on a comparison of a mean utilization of one or more physical computing resources of the node to a threshold utilization value. In some cases, the threshold utilization may range from 50% to 95% utilization. As an example, based on a utilization of one or more of the physical computing resources of a node being less than a threshold utilization (e.g., less than a threshold percentage utilization), the node may dequeue and admit metadata for log entries from the virtual admission queue at a first rate (e.g., 10 MB per second). As another example, based on a utilization of one or more of the physical computing resources of a node being greater than a threshold utilization (e.g., greater than a threshold percentage utilization), the node may dequeue and admit metadata for log entries from the virtual admission queue at a second rate (e.g., 1 MB per second) lower than the first rate.

In some embodiments, a threshold utilization of one or more physical computing resources at a node used to control (e.g., limit) a rate at which metadata is dequeued from a virtual admission queue operating at the node may be based on a type of the physical computing resources at the node (e.g., CPU, non-volatile storage, or volatile memory) and the tolerated latencies supported by workloads stored by the cluster (e.g., cluster 102) of nodes. Generally, a workload that can tolerate higher latencies for executing write requests may be able to tolerate higher threshold utilization values without requiring limiting rates for dequeuing of metadata from virtual admission queues operated by nodes storing replicas of ranges included in the workload. As an example, for a particular workload requiring less than 10 millisecond (ms) write latencies and when a range of the workload is receiving write requests at a millisecond granularity for a replica stored by a particular node, the node may experience 5 ms or greater queue times for metadata in the virtual admission queue even when mean utilization of the CPU of the node is 60%. To maintain 10 ms write latencies, the node may limit dequeuing of metadata from the virtual admission queue based on the 60% utilization of the CPU exceeding a threshold utilization value. As another example, for a particular workload requiring less than 500 ms write latencies and when a range of the workload is receiving write requests at a millisecond granularity for a replica stored by a particular node, the node may experience 5 ms or greater queue times for metadata in the virtual admission queue even when mean utilization of the CPU of the node is 60%. Accordingly, the node may not need to limit dequeuing of metadata (e.g., at a slower rate) from the virtual admission queue and may allow CPU utilization to significantly exceed 60% utilization (e.g., 85% utilization) based on the workload tolerating increased write latencies.

In some embodiments, an order in which a node may dequeue metadata for log entries from the virtual admission queue may be based on one or more of: inter-tenant fairness, inter-workload fairness, priority levels of write requests corresponding to the queued metadata, and timestamps of write requests corresponding to the queued metadata. In some cases, a node may dequeue metadata for log entries from a virtual admission queue at a selected rate (e.g., 1 MB per second) on a per-tenant basis and/or a per-workload basis. As an example, a node may dequeue metadata for log entries from a virtual admission queue at the node at a selected rate (e.g., 1 MB per second) for each tenant, such that metadata for log entries corresponding to different tenants are dequeued from the virtual admission queue at approximately the same rate based on the ordering of the metadata in the virtual admission queue to ensure inter-tenant fairness. As another example, a node may dequeue metadata for log entries from a virtual admission queue at the node at a selected rate (e.g., 1 MB per second) for each workload, such that metadata for log entries corresponding to different workloads are dequeued from the virtual admission queue at approximately the same rate based on the ordering of the metadata in the virtual admission queue to ensure inter-workload fairness. In some cases, for a particular tenant and/or workload, an order in which a node may sequence and dequeue metadata for log entries for a particular tenant and/or particular workload (e.g., intra-tenant and/or intra-workload) from a virtual admission queue at the node may be based on priority levels, timestamps, and/or FIFO semantics of the metadata for the log entries. As a first example, the node may dequeue metadata having a first priority level before dequeuing metadata having a second priority level, where the first priority level is greater than the second priority level. As a second example, the node may dequeue metadata having a first timestamp before dequeuing metadata having a second timestamp, where the first timestamp is before the second timestamp. As a third example, the node may dequeue first metadata from the virtual admission queue before dequeuing second metadata, where the first metadata was added to the virtual admission queue before the second metadata. As described herein, metadata for a log entry may have a timestamp equivalent to the assigned timestamp for the transaction from which the log entry was derived.

In some embodiments, as described herein, the leader node may proceed to cause execution of the write request when a majority of the send queues 418 for the follower nodes and leader node to which the write request is directed are empty or made empty (e.g., by force flushing). To execute the write request, the leader node may simultaneously (i) generate and queue metadata for the log entry in a virtual admission queue 422 using any suitable queuing techniques and (ii) write the log entry to the Raft log of the leader node and cause writing to the state machine of the leader node in its store 426 according to the written log entry. In some cases, queueing techniques by which the log entry is queued in the virtual admission queue can include those described further in U.S. patent application Ser. No. 18/320,671, which is hereby incorporated by reference herein in its entirety. After the log entry is queued in the virtual admission queue 422, the leader node may dequeue and admit the log entry from the virtual admission queue based on a utilization of one or more physical computing resources at the leader node as described herein. In response to dequeuing metadata for the log entry and when the log entry corresponds to regular work, the leader node can replenish evaluation tokens consumed by the write request from which the log entry was derived to each of the evaluation token pools corresponding to regular and elastic work for the stream to which the write request is directed and that represents the store of the leader node. In response to dequeuing the metadata for the log entry and when the log entry corresponds to elastic work, the leader node can replenish 436 evaluation tokens consumed by the write request from which the log entry was derived to the evaluation token pool corresponding to only elastic work for the stream to which the write request is directed and that represents the store of the leader node. The replenished evaluation tokens can have a size equivalent to the size of the write request as described herein.

In some embodiments, as described herein, the leader node may proceed to cause execution of the write request when a majority of the send queues 418 for the follower nodes and leader node to which the write request is directed are empty or made empty (e.g., by force flushing). To execute the write request, the leader node may send the log entry to one or more follower nodes storing the follower replicas of the consensus group to which the log entry is directed based on the conditions described herein. The follower node may receive the log entry from the leader node. In response to receiving the log entry, the follower node may simultaneously (i) generate and queue metadata for the log entry in a virtual admission queue (not shown in FIG. 4) using any suitable queuing techniques and (ii) write the log entry to the Raft log of that follower node and cause writing to the state machine of that follower node in its store according to the written log entry. In some cases, queueing techniques by which the log entry is queued in the virtual admission queue can include those described further in U.S. patent application Ser. No. 18/320,671, which is hereby incorporated by reference herein in its entirety. After the log entry is queued in the virtual admission queue, the follower node may dequeue and admit the log entry from the virtual admission queue based on a utilization of one or more physical computing resources at the leader node.

In some embodiments, in response to dequeuing the metadata for the log entry from the virtual admission queue, the follower node can send dequeuing instructions to the leader node from which the log entry originates, where the dequeuing instructions include (i) an indication the log entry was dequeued (e.g., admitted) from the virtual admission queue, (ii) an instruction to replenish (e.g., add) tokens to the each of the evaluation token pool(s) and send token pool(s) from which tokens were deducted for that log entry. In response to receiving the dequeuing instructions and when the log entry corresponds to regular work, the leader node can replenish evaluation tokens consumed by the write request from which the log entry was derived to each of the evaluation token pools corresponding to regular and elastic work for the stream to which the write request is directed and that represents the store of the follower node. In response to receiving the dequeuing instructions and when the log entry corresponds to regular work, the leader node can replenish send tokens consumed by the log entry to each of the send token pools corresponding to regular and elastic work for the follower node to which the log entry was sent. In response to receiving the dequeuing instructions and when the log entry corresponds to elastic work, the leader node can replenish evaluation tokens consumed by the write request from which the log entry was derived to the evaluation token pool corresponding to only elastic work for the stream to which the write request is directed and that represents the store of the leader node. The replenished tokens can have a size equivalent to the size of the write request as described herein. In response to receiving the dequeuing instructions and when the log entry corresponds to elastic work, the leader node can replenish send tokens consumed by the log entry to the send token pool corresponding to only elastic work for the follower node to which the log entry was sent.

Accordingly, via the quorum flow admission control techniques described herein, evaluation and send tokens can be consumed and replenished based on evaluation of write requests, sending of log entries to follower replicas, and admission of log entries to LSM tree storage systems to pace replication without delaying consensus groups from achieving consensus. While the particular techniques are described herein with respect to LSM tree storage systems, such techniques may be applied to pace replication to any suitable storage system operated by nodes that form a consensus group.

Figure 5:
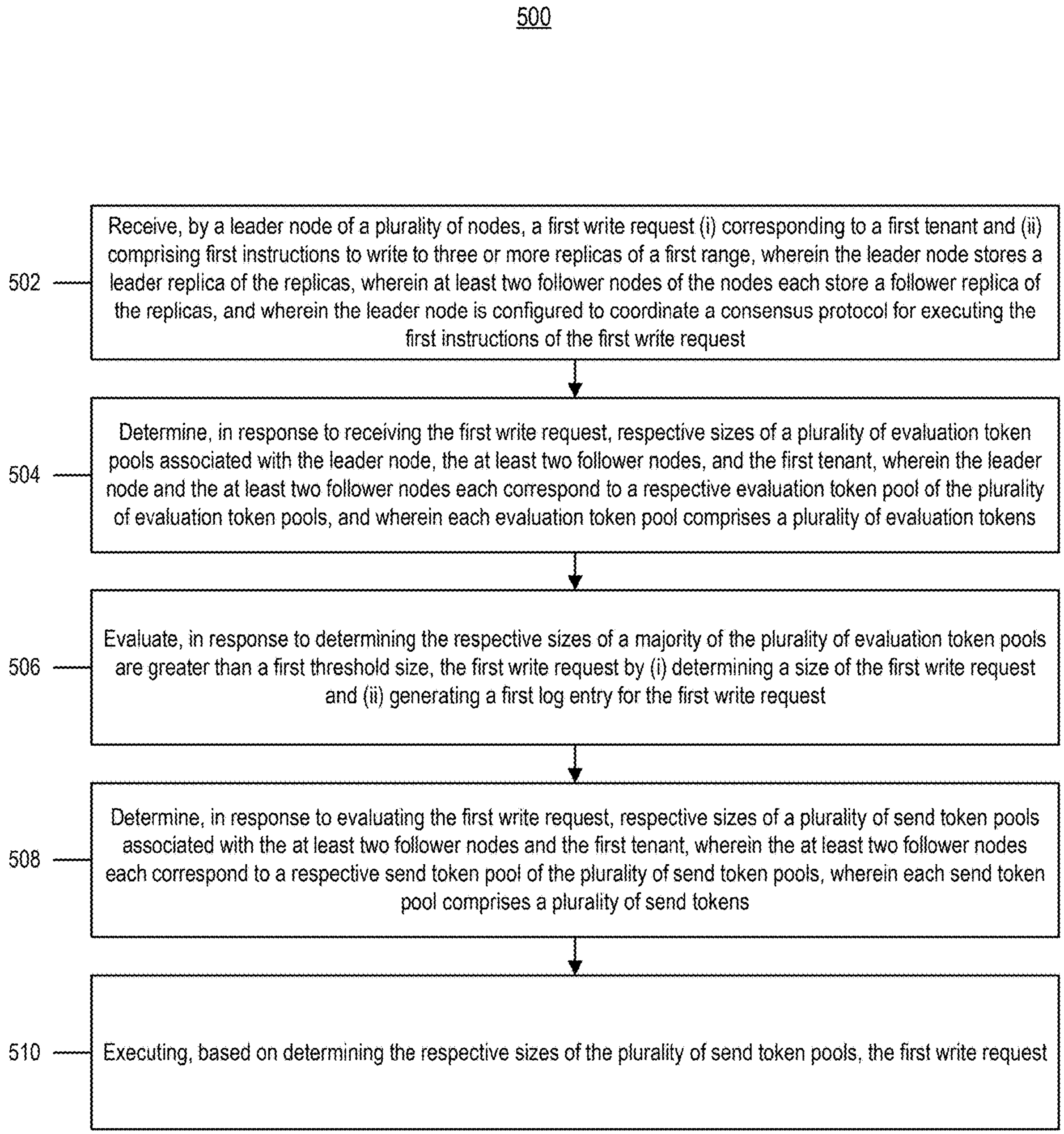
FIG. 5 shows an exemplary flowchart of a method for processing a write request using quorum flow admission control techniques, according to some embodiments.

Exemplary Method for Write Request Processing for a Consensus Group Using Quorum Flow Admission Control In some embodiments, as described herein, the nodes storing replicas of a consensus group for a particular range may execute a consensus protocol using quorum flow admission control techniques to commit write requests to the replicas of the range. Such a consensus group can therefore use evaluation token pools and send token pools for streams included in the consensus group along with evaluation and send queues to pace evaluation of write requests and pace replication of generated log entries, respectively. The consensus group can include the leader replica and the follower replicas of the range, which form the voting replicas of the range. The techniques described herein may be executed differently based on whether the write request corresponds to regular work or elastic work. As an example, deduction from evaluation and send token pools can vary based on whether the write request corresponds to regular work or elastic work Referring to FIG. 5, an exemplary flowchart of a method 500 for processing a write request using a consensus protocol and admission control techniques is illustrated. While the method 500 is described with respect to a single write request directed to a range replicated among at least three replicas, the method 500 may be executed in parallel (e.g., simultaneously) by a number of consensus groups stored by the cluster (e.g., cluster 102) for a number of write requests and increased numbers of replicas may be included in a consensus group to provide additional tolerance to node failures. Evaluation and send token pools that are evaluated for a write request as described with respect to the method 500 may be those token pools for the streams to which the write request is directed and is to be replicated. In some cases, a client device 106 may send the write request to the cluster 102 as a part of a transaction including one or more requests. In other cases, the write request may be derived from elastic work and may not be directly sent by a client device 106. A gateway node may receive and assign a timestamp to the transaction as described herein and may route the write request to a leaseholder node storing the leaseholder replica for a range to which the write request is directed. In some cases, the leaseholder replica may also be the leader replica for the range.

At step 502, a leader node (e.g., node 120*a*) storing a leader replica for a range can receive a first write request (i) corresponding to a first tenant and (ii) including first instructions to write to three or more replicas of a first range. The write request may be configured to modify the respective states of the three or more replicas of the first range. At least two follower nodes can each store a respective follower replica of the replicas. The leader node can be configured to configured to coordinate a consensus protocol (e.g., Raft protocol) for executing the first instructions of the first write request. As an example, the consensus protocol can include operations described herein at least with respect to the method 300.

At step 504, the leader node may determine, in response to receiving the first write request, respective sizes of a number of evaluation token pools associated with the leader node, the at least two follower nodes, and the first tenant. The evaluation token pools for which respective sizes are determined may be evaluation token pools for the streams to which the write request is directed. The evaluation token pools for which respective sizes are determined may be evaluation token pools for elastic work or evaluation token pools for elastic and regular work based on whether the write request is for elastic work or regular work as described herein. The leader node and the at least two follower nodes can each correspond to at least one respective evaluation token pool of the number of evaluation token pools. Each evaluation token pool can include a number of evaluation tokens as described herein, with evaluation tokens being able to be deducted from and replenished to each evaluation token pool. In some cases, the leader node may operate and store each of the evaluation token pools for the streams to which the write request is directed. In some cases, the number of evaluation token pools for the streams to which the write request is directed can correspond to a first workload for the first tenant represented by the streams. The first workload can include one or more ranges stored by the number of nodes, with the one or more ranges including the first range. As described herein, the leader node can use the number of evaluation token pools for which respective sizes are determined to determine when to perform evaluation of the first write request.

In some cases, the leader node can compare the respective sizes of the number of evaluation token pools to a first threshold size (e.g., 0 bytes). In some cases, based on the comparison, the leader node can determine the respective sizes of a majority of the number of evaluation token pools are greater than a first threshold size. As an example, when the first write request corresponds to regular work, the leader node can perform the comparison to determine whether the respective sizes of a majority of the number of evaluation token pools corresponding to regular work are greater than a first threshold size. In some cases, based on the comparison, the leader node can determine the respective sizes of a each of the number of evaluation token pools are greater than a first threshold size. As an example, when the first write request corresponds to elastic work, the leader node can perform the comparison to determine whether the respective sizes of each of the number of evaluation token pools corresponding to elastic work are greater than a first threshold size.

At step 506, the leader node may evaluate, in response to determining the respective sizes of a majority of the number of evaluation token pools are greater than a first threshold size, the first write request by (i) determining a size of the first write request and (ii) generating a first log entry for the first write request. In some cases, evaluation of the first write request may include a number of operations as described herein at least with respect to the method 300. The leader node may evaluate the first write request in response to determining the respective sizes of a majority of the number of evaluation token pools are greater than a first threshold size when the first write request corresponds to regular work as described herein. In some cases, the leader node may evaluate the first write request in response to determining the respective sizes of each of the number of evaluation token pools are greater than the first threshold size when the first write request corresponds to elastic work as described herein. In some cases, the majority of the evaluation token pools having respective sizes greater than the threshold size can be required to include the evaluation token pool for the stream representing a store of the leader replica to which the first write request is directed.

In some cases, the leader node can queue the first request in an evaluation queue corresponding to the first range and operated by the leader node in response to determining the respective sizes of less than the majority of the plurality of evaluation token pools are greater the first threshold size. In some cases, when the first write request corresponds to regular work as described herein, the leader node can queue the first request in an evaluation queue corresponding to the first range and operated by the leader node in response to determining the respective sizes of less than the majority of the plurality of evaluation token pools are greater the first threshold size. In some cases, when the first write request corresponds to elastic work as described herein, the leader node can queue the first request in an evaluation queue corresponding to the first range and operated by the leader node in response to determining the respective sizes of each of the majority of the plurality of evaluation token pools are not greater the first threshold size.

In some cases, the leader node can deduct, in response to evaluating the first write request, the size of the first write request from the evaluation tokens of each of the number of evaluation token pools. When the first write request corresponds to regular work, the leader node can deduct the size of the first write request from the evaluation tokens of each of the number of evaluation token pools corresponding to regular and elastic work as described herein. When the first write request corresponds to elastic work, the leader node can deduct the size of the first write request from the evaluation tokens of each of the number of evaluation token pools corresponding to only elastic work as described herein.

At step 508, the leader node can determine, in response to evaluating the first write request, respective sizes of a number of send token pools associated with the follower nodes and the first tenant. The at least two follower nodes can each correspond to at least one respective send token pool of the number of send token pools. Each send token pool can include a number of send tokens. The send token pools for which respective sizes are determined may be send token pools for elastic work or send token pools for elastic and regular work based on whether the write request is for elastic work or regular work as described herein. The at least two follower nodes can each correspond to at least one respective send token pool of the number of send token pools. Each send token pool can include a number of send tokens as described herein, with send tokens being able to be deducted from and replenished to each send token pool. In some cases, the leader node may operate and store each of the send token pools for the non-local streams to which the write request is directed. In some cases, the number of send token pools for the streams to which the write request is directed can correspond to a first workload for the first tenant represented by the streams. The leader node can use the number of send token pools to determine when to send a first log entry generated from the first write request to the at least two follower nodes. In some cases, the leader node can compare the respective sizes of the number of send token pools to a second threshold size (e.g., 0 bytes) that is the same as or different from the first threshold size.

In some cases, the leader node can operate and store a number of send queues including (i) a leader send queue associated with the leader node, (ii) a first send queue associated with the first follower node of the at least two follower nodes, and (iii) a second send queue associated with a second follower node of the at least two follower nodes. The leader node may not queue any log entries in the leader send queue, such that the leader send queue remains empty.

At step 510, the leader node and the follower nodes can execute, based on determining the respective sizes of the number of send token pools, the first write request. Execution of the first write request may include a number of operations as described herein at least with respect to the method 300. Executing the first write request can include sending the first log entry to a first follower node of the at least two follower nodes based on the respective size of the send token pool corresponding to the first follower node. The first follower node can be configured to write to the follower replica stored by the first follower node using the first log entry. Executing the first write request can include writing to the leader replica based on the first log entry. Executing the first write request can include sending the first log entry to a second follower node of the at least two follower nodes based on the respective size of the send token pool corresponding to the second follower node. The second follower node can be configured to write to the follower replica stored by the second follower node using the first log entry.

In some cases, the leader node may only send the first log entry to the first follower node in response to determining (i) the respective size of the send token pool corresponding to the first follower node is greater than a second threshold size and (ii) the first send queue associated with the first follower node is empty. In some cases, the leader node can queue the first log entry in the first send queue in response to determining the respective size of the send token pool corresponding to the first follower node is less than or equal to a second threshold size. In some cases, the leader node can deduct, in response to sending the first log entry to the first follower node, the size of the first write request from the send tokens of the send token pool corresponding to the first follower node. When the first write request corresponds to regular work, the leader node can deduct the size of the first write request from the send tokens of each of the number of send token pools for the first follower node corresponding to regular and elastic work as described herein. When the first write request corresponds to elastic work, the leader node can deduct the size of the first write request from the send tokens of the send token pool for the first follower node corresponding to only elastic work as described herein. Similar techniques may be applied to the second follower node and any other follower nodes storing replicas of the first range.

In some cases, in response to evaluation of the first write request, the leader node can determine less than a majority of the number of send queues are empty. The majority of the number of send queues can be required to include the leader send queue, with the first send queue including one or more first log entries and the second send queue including one or more second log entries. A send queue may not be empty when it includes at least one log entry waiting to be send to a respective follower node. In some cases, the leader node can flush, in response determining less than the majority of the number of send queues are empty, at least one of the first send queue or the second send queue to cause its queued log entries to be sent to the first follower node or second follower node, respectively. In some cases, flushing at least one of the first send queue or the second send queue can further include flushing at least the first send queue by sending the one or more first log entries to the first follower node. The leader node can deduct, in response to sending the one or more first log entries to the first follower node, the size of the one or more first log entries from the send tokens of the send token pool corresponding to the first follower node. The first send queue can be flushed based on a first number of the send tokens of the send token pool corresponding to the first follower node being greater than a second number of the send tokens of the send token pool corresponding to the second follower node. Similar techniques may be applied to prevent less than a majority of the number of send queues from becoming empty.

In some cases, the first follower node is configured to operate an admission queue. In response to receiving the first log entry from the leader node, the first follower node can queue first metadata for the first log entry in the admission queue. The admission queue can be configured to queue metadata for a number of log entries configured to write to one or more stores of the first follower node. The metadata for the number of log entries can include the first metadata for the first log entry. The first follower node can dequeue, based on a utilization of physical resources of the first follower node, the first log entry from the admission queue and cause addition, in response to dequeuing the first metadata for the first log entry from the admission queue, of the size of the first write request to (i) the evaluation tokens of the evaluation token pool corresponding to the first follower node and (ii) the send tokens of the send token pool corresponding to the first follower node. In some cases, the leader node is configured to track the first metadata dequeued from the admission queue (e.g., using an admitted vector as described herein) to control the addition of the size of the first write request to (i) the evaluation tokens of the evaluation token pool corresponding to the first follower node and (ii) the send tokens of the send token pool corresponding to the first follower node. Similar techniques may be applied to the second follower node and any other follower nodes storing replicas of the first range.

In some cases, the leader replica writing to the leader replica can further include, in response to a majority of the leader node and the at least two follower nodes writing the first log entry to a respective write (e.g., Raft) log stored by each of the leader node and the at least two follower nodes, writing to modify a state of the leader replica in a state machine of the leader node based on the first log entry.

In some cases, the leader node is configured to operate an admission queue. In response to evaluation of the first write request and/or flushing at least one of the first send queue or the second send queue, the leader node can queue first metadata for the first log entry in the admission queue. The admission queue can be configured to queue metadata for a number of log entries configured to write to one or more stores of the leader node. The metadata for the number of log entries can include the first metadata for the first log entry. The leader node can dequeue, based on a utilization of physical resources of the leader node, the first log entry from the admission queue and add, in response to dequeuing the first metadata for the first log entry from the admission queue, the size of the first write request to the evaluation tokens of the evaluation token pool corresponding to the leader node.

FURTHER DESCRIPTION OF SOME EMBODIMENTS

Figure 6:
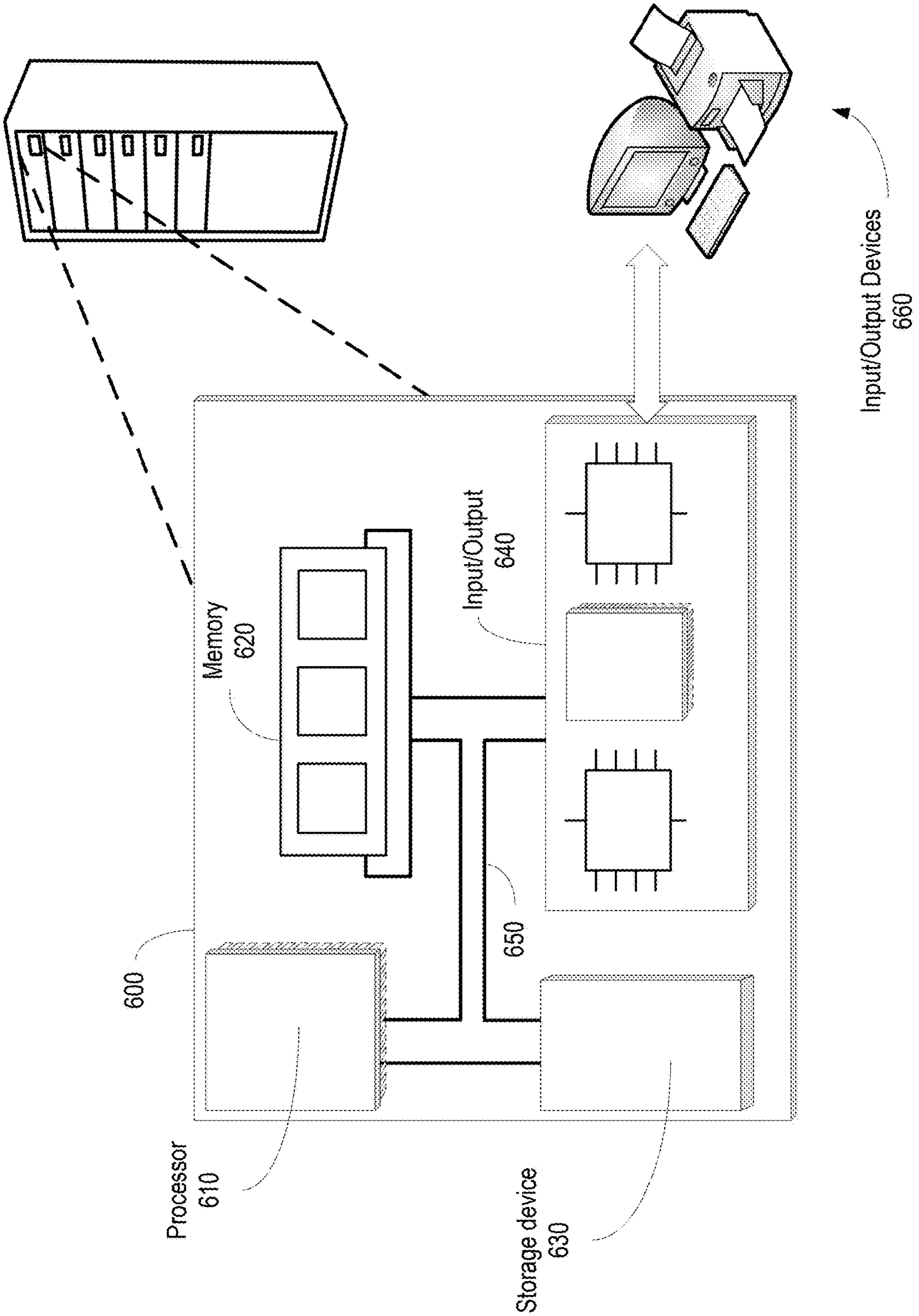
FIG. 6 is a block diagram of an example computer system.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, for example as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for controlling execution of distributed operations, the method comprising:

receiving, by a leader node of a plurality of nodes, a first write request (i) corresponding to a first tenant and (ii) comprising first instructions to write to three or more replicas of a first range, wherein the leader node stores a leader replica of the replicas, wherein at least two follower nodes of the nodes each store a follower replica of the replicas, and wherein the leader node is configured to coordinate a consensus protocol for executing the first instructions of the first write request;

determining, in response to receiving the first write request, respective sizes of a plurality of evaluation token pools associated with the leader node, the at least two follower nodes, and the first tenant, wherein the leader node and the at least two follower nodes each correspond to a respective evaluation token pool of the plurality of evaluation token pools, and wherein each evaluation token pool comprises a plurality of evaluation tokens;

evaluating, in response to determining the respective sizes of a majority of the plurality of evaluation token pools are greater than a first threshold size, the first write request by (i) determining a size of the first write request and (ii) generating a first log entry for the first write request;

determining, in response to evaluating the first write request, respective sizes of a plurality of send token pools associated with the at least two follower nodes and the first tenant, wherein the at least two follower nodes each correspond to a respective send token pool of the plurality of send token pools, wherein each send token pool comprises a plurality of send tokens; and executing, based on determining the respective sizes of the plurality of send token pools, the first write request, the executing comprising:

sending the first log entry to a first follower node of the at least two follower nodes based on the respective size of the send token pool corresponding to the first follower node, wherein the first follower node is configured to write to the follower replica stored by the first follower node using the first log entry; and writing to the leader replica based on the first log entry.

2. The method of claim 1, wherein the first write request originates from a client device associated with the first tenant.

3. The method of claim 1, wherein the leader node stores the plurality of evaluation token pools and the plurality of send token pools.

4. The method of claim 1, wherein the plurality of evaluation token pools and the plurality of send token pools correspond to a first workload for the first tenant, the first workload comprising one or more ranges stored by the plurality of nodes, wherein the one or more ranges comprise the first range.

5. The method of claim 1, wherein the leader node uses the plurality of evaluation token pools to determine when to evaluate the first write request.

6. The method of claim 1, further comprising:

comparing the respective sizes of the plurality of evaluation token pools to the first threshold size.

7. The method of claim 1, further comprising:

queuing the first write request in an evaluation queue corresponding to the first range and operated by the leader node in response to determining the respective sizes of less than the majority of the plurality of evaluation token pools are greater than the first threshold size.

8. The method of claim 1, wherein the first write request is an elastic write request, and wherein evaluating the first write request further comprises:

evaluating, in response to determining the respective sizes of each of the plurality of evaluation token pools are greater than the first threshold size, the first write request by (i) determining the size of the first write request and (ii) generating the first log entry for the first write request.

9. The method of claim 1, further comprising:

deducting, in response to evaluating the first write request, the size of the first write request from the evaluation tokens of each of the plurality of evaluation token pools.

10. The method of claim 1, wherein the leader node uses the plurality of send token pools to determine when to send the first log entry to the at least two follower nodes.

11. The method of claim 1, further comprising:

comparing the respective sizes of the plurality of send token pools to a second threshold size.

12. The method of claim 1, wherein the leader node operates a plurality of send queues comprising (i) a leader send queue associated with the leader node, (ii) a first send queue associated with the first follower node of the at least two follower nodes, and (iii) a second send queue associated with a second follower node of the at least two follower nodes.

13. The method of claim 12, wherein sending the first log entry to the first follower node further comprises:

sending the first log entry to the first follower node in response to determining (i) the respective size of the send token pool corresponding to the first follower node is greater than a second threshold size and (ii) the first send queue associated with the first follower node is empty.

14. The method of claim 12, further comprising:

queuing the first log entry in the first send queue in response to determining the respective size of the send token pool corresponding to the first follower node is less than or equal to a second threshold size.

15. The method of claim 12, further comprising:

deducting, in response to sending the first log entry to the first follower node, the size of the first write request from the send tokens of the send token pool corresponding to the first follower node.

16. The method of claim 15, wherein the first follower node is configured to operate an admission queue and to perform operations comprising:

queuing first metadata for the first log entry in the admission queue, wherein the admission queue is configured to queue metadata for a plurality of log entries configured to write to one or more stores of the first follower node, and wherein the metadata for the plurality of log entries comprises the first metadata for the first log entry;

dequeuing, based on a utilization of physical resources of the first follower node, the first metadata for the first log entry from the admission queue; and causing addition, in response to dequeuing the first metadata for the first log entry from the admission queue, of the size of the first write request to (i) the evaluation tokens of the evaluation token pool corresponding to the first follower node and (ii) the send tokens of the send token pool corresponding to the first follower node.

17. The method of claim 16, wherein the leader node is configured to track the first metadata dequeued from the admission queue to control the addition of the size of the first write request to (i) the evaluation tokens of the evaluation token pool corresponding to the first follower node and (ii) the send tokens of the send token pool corresponding to the first follower node.

18. The method of claim 12, further comprising:

determining less than a majority of the plurality of send queues are empty, the majority of the plurality of send queues comprising the leader send queue, wherein the first send queue comprises one or more first log entries, and wherein the second send queue comprises one or more second log entries; and flushing, in response to determining less than the majority of the plurality of send queues are empty, at least one of the first send queue or the second send queue.

19. The method of claim 18, wherein flushing at least one of the first send queue or the second send queue further comprises flushing at least the first send queue by sending the one or more first log entries to the first follower node, and further comprising:

deducting, in response to sending the one or more first log entries to the first follower node, the size of the one or more first log entries from the send tokens of the send token pool corresponding to the first follower node.

20. The method of claim 18, wherein the first send queue is flushed based on a first number of the send tokens of the send token pool corresponding to the first follower node being greater than a second number of the send tokens of the send token pool corresponding to the second follower node.

21. The method of claim 1, wherein writing to the leader replica further comprises:

in response to a majority of the leader node and the at least two follower nodes writing the first log entry to a respective write log stored by each of the leader node and the at least two follower nodes, writing to modify a state of the leader replica in a state machine of the leader node based on the first log entry.

22. The method of claim 1, wherein the leader node operates an admission queue, further comprising:

queuing first metadata for the first log entry in the admission queue, wherein the admission queue is configured to queue metadata for a plurality of log entries configured to write to one or more stores of the leader node, and wherein the metadata for the plurality of log entries comprises the first metadata for the first log entry;

dequeuing, based on a utilization of physical resources of the leader node, the first metadata for the first log entry from the admission queue; and adding, in response to dequeuing the first metadata for the first log entry from the admission queue, the size of the first write request to the evaluation tokens of the evaluation token pool corresponding to the leader node.

23. A system for controlling execution of distributed operations, the system comprising:

one or more nodes of a plurality of nodes configured to perform operations comprising:

receiving, by a leader node of the plurality of nodes, a first write request (i) corresponding to a first tenant and (ii) comprising first instructions to write to three or more replicas of a first range, wherein the leader node stores a leader replica of the replicas, wherein at least two follower nodes of the nodes each store a follower replica of the replicas, and wherein the leader node is configured to coordinate a consensus protocol for executing the first instructions of the first write request;

determining, in response to receiving the first write request, respective sizes of a plurality of evaluation token pools associated with the leader node, the at least two follower nodes, and the first tenant, wherein the leader node and the at least two follower nodes each correspond to a respective evaluation token pool of the plurality of evaluation token pools, and wherein each evaluation token pool comprises a plurality of evaluation tokens;

evaluating, in response to determining the respective sizes of a majority of the plurality of evaluation token pools are greater than a first threshold size, the first write request by (i) determining a size of the first write request and (ii) generating a first log entry for the first write request;

determining, in response to evaluating the first write request, respective sizes of a plurality of send token pools associated with the at least two follower nodes and the first tenant, wherein the at least two follower nodes each correspond to a respective send token pool of the plurality of send token pools, wherein each send token pool comprises a plurality of send tokens; and executing, based on determining the respective sizes of the plurality of send token pools, the first write request, the executing comprising:

sending the first log entry to a first follower node of the at least two follower nodes based on the respective size of the send token pool corresponding to the first follower node, wherein the first follower node is configured to write to the follower replica stored by the first follower node using the first log entry; and writing to the leader replica based on the first log entry.

* * * * *